US011711362B2

(12) United States Patent
Chow et al.

(10) Patent No.: US 11,711,362 B2
(45) Date of Patent: *Jul. 25, 2023

(54) DYNAMIC BIOMETRIC AUTHENTICATION BASED ON DISTRIBUTED LEDGER DATA

(71) Applicant: The Toronto-Dominion Bank, Toronto (CA)

(72) Inventors: Arthur Carroll Chow, Markham (CA); Anthony Haituyen Nguyen, Toronto (CA); Perry Aaron Jones Haldenby, Toronto (CA); Milos Dunjic, Oakville (CA); David Tax, Toronto (CA); John Jong-Suk Lee, Toronto (CA); Arun Victor Jagga, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 66 days.

This patent is subject to a terminal disclaimer.

(21) Appl. No.: 17/180,908

(22) Filed: Feb. 22, 2021

(65) Prior Publication Data

US 2021/0176244 A1    Jun. 10, 2021

Related U.S. Application Data

(63) Continuation of application No. 15/946,703, filed on Apr. 5, 2018, now Pat. No. 10,958,642.

(51) Int. Cl.
*H04L 9/40* (2022.01)
*H04L 9/32* (2006.01)
*H04L 9/06* (2006.01)

(52) U.S. Cl.
CPC ........ *H04L 63/0861* (2013.01); *H04L 9/0643* (2013.01); *H04L 9/3231* (2013.01); *H04L 9/3239* (2013.01)

(58) Field of Classification Search
CPC . H04L 63/0861; H04L 9/0643; H04L 9/3231; H04L 9/3239; G06K 9/001;
(Continued)

(56) References Cited

U.S. PATENT DOCUMENTS

2001/0036299 A1\* 11/2001 Senior .................... G06F 1/169
382/124
2003/0172166 A1    9/2003 Judge et al.
(Continued)

FOREIGN PATENT DOCUMENTS

| GB | 2538022 A | 11/2016 |
| WO | 2017044554 A1 | 3/2017 |
| WO | 2017066002 A1 | 4/2017 |

OTHER PUBLICATIONS

"Biometrics as a Service," retrieved from https://www.hypr.com/biometrics-as-a-service/ on Apr. 5, 2018 (3 pages).

*Primary Examiner* — Ashokkumar B Patel
*Assistant Examiner* — William B Jones
(74) *Attorney, Agent, or Firm* — Duane Morris LLP

(57) ABSTRACT

The disclosed exemplary embodiments include computer-implemented devices, apparatuses, and processes that, among other things, perform dynamic biometric authentication based on distributed ledger data. For example, a device may compute a first hash value based on first biometric data captured by a sensor unit, and may transmit a request to, and receive a response from, a computing system across a communications network via the communications unit. The request may cause the computing system to execute instructions maintained within the distributed ledger data, and to extract second biometric data maintained within an element of the distributed ledger data. The second biometric data may include a second hash, which the computing system may incorporate into the response. The device may authen-
(Continued)

ticate an identity associated with the device when the first hash value corresponds to the second hash value incorporated within the response.

20 Claims, 10 Drawing Sheets

(58) Field of Classification Search
CPC ....... G06K 9/0008; G05B 2219/24162; G01N 2021/3196
See application file for complete search history.

(56) References Cited

U.S. PATENT DOCUMENTS

| | | |
|---|---|---|
| 2010/0119126 A1* | 5/2010 | Rane .................. G06V 40/1347 382/125 |
| 2011/0270748 A1 | 11/2011 | Graham, III et al. |
| 2016/0300234 A1 | 1/2016 | Moss-Pultz et al. |
| 2016/0072800 A1 | 3/2016 | Soon-Shiong et al. |
| 2016/0085955 A1 | 3/2016 | Lerner |
| 2016/0098723 A1 | 4/2016 | Feeney |
| 2016/0300252 A1 | 10/2016 | Frank et al. |
| 2016/0358185 A1 | 12/2016 | Maxwell |
| 2017/0006028 A1 | 1/2017 | Tunnell et al. |
| 2017/0039409 A1* | 2/2017 | Han ........................ G06V 40/13 |
| 2017/0192994 A1 | 7/2017 | Hong et al. |
| 2018/0115426 A1* | 4/2018 | Andrade .................. H04L 9/30 |
| 2018/0165508 A1 | 6/2018 | Othman |
| 2018/0204111 A1 | 7/2018 | Zadeh |

\* cited by examiner

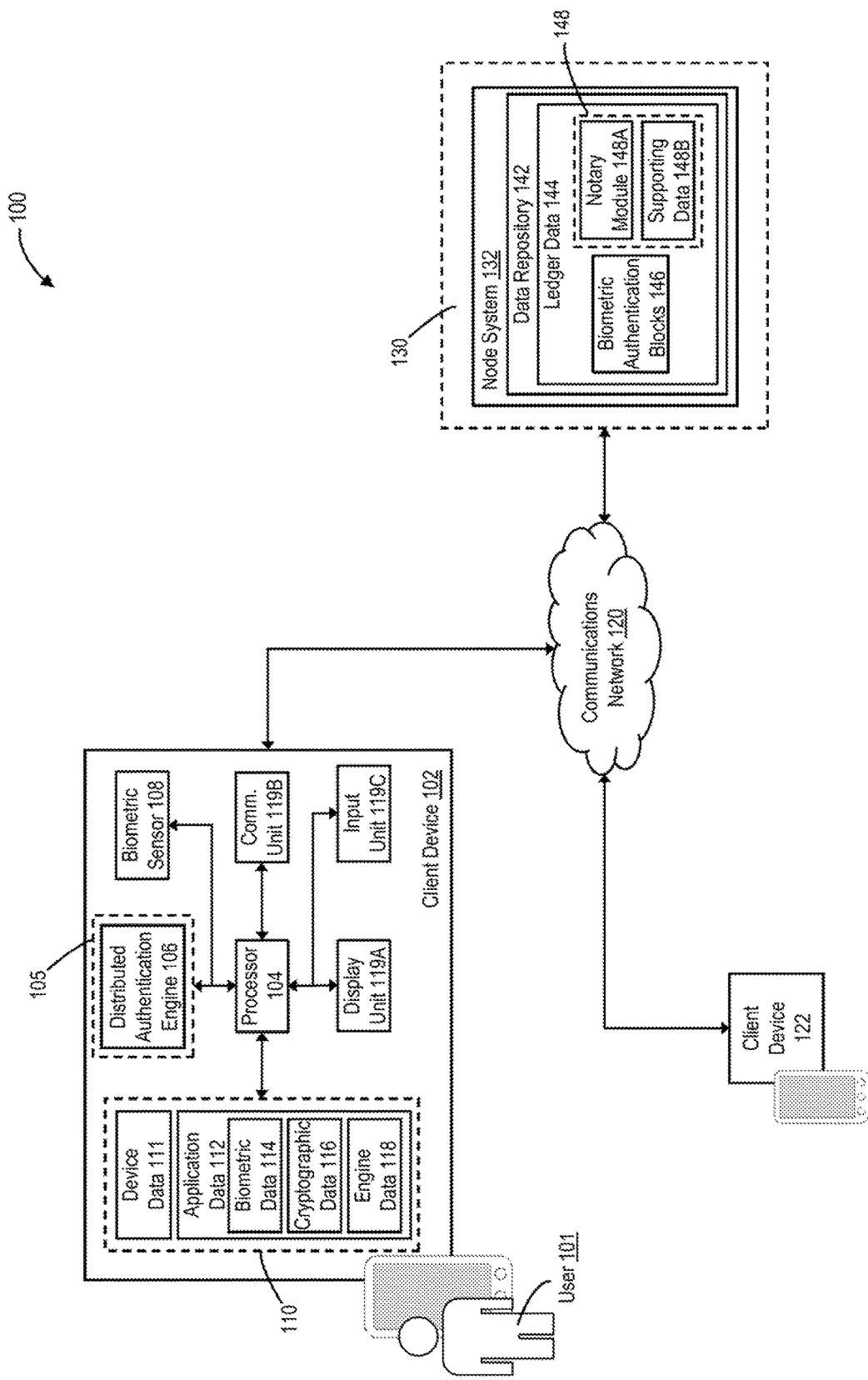

DYNAMIC BIOMETRIC AUTHENTICATION BASED ON DISTRIBUTED LEDGER DATA

CROSS-REFERENCE TO RELATED APPLICATION

This application is a continuation of, and claims the benefit of priority to, U.S. application Ser. No. 15/946,703, filed Apr. 5, 2018, the disclosure of which is incorporated by reference herein to its entirety.

TECHNICAL FIELD

The disclosed embodiments generally relate to computer-implemented systems and processes for dynamic biometric authentication based on distributed ledger data.

BACKGROUND

Today, many mobile devices, such as smart phones and tablet computing devices, include hardware capable of monitoring biometric characteristics exhibited by users, and of capturing biometric data that specifies these biometric characteristics. Many mobile devices also implement centralized processes for authenticating a user's identity based on locally established and maintained biometric reference data.

SUMMARY

In some examples, a device includes a sensor unit, a communications unit, a storage unit storing instructions, and at least one processor coupled to the sensor unit, the communications unit, and the storage unit. The at least one processor is configured to execute the instructions to compute a first hash value based on first biometric data. The first biometric data may be captured by the sensor unit, and at least one processor is further configured to transmit a request to, and receive a response from, a computing system across a communications network via the communications unit. The request may cause the computing system to execute instructions included within distributed ledger data and extract second biometric data maintained within an element of the distributed ledger data. Further, the second biometric data may include a second hash value, and the response may include the second biometric data. The at least one processor is further configured to authenticate an identity associated with the device when the first hash value corresponds to the second hash value.

In other examples, a computer-implemented method includes computing, by at least one processor, a first hash value based on first biometric data captured by a sensor unit, and by the at least one processor, transmitting a request to, and receiving a response from, a computing system across a communications network. The request may cause the computing system to execute instructions included within distributed ledger data, the response may include second biometric data maintained within a portion of the distributed ledger data, and the second biometric data may include a second hash value. The computer-implemented method also includes authenticating, by the at least one processor, an identity associated with a device when the first hash value corresponds to the second hash value.

Further, in some examples, a device includes a sensor unit, a communications unit, a storage unit storing instructions, and at least one processor coupled to the sensor unit, the communications unit, and the storage unit. The at least one processor is configured to execute the instructions to receive biometric data captured by the sensor unit, compute one or more hash values based on portions of the received biometric data; and generate and transmit an enrollment request to a computing system across a communications network via the communications unit. The enrollment request may include the portions of the biometric data, the one or more hash values, and a public cryptographic key. Further, the enrollment request may cause the computing system to execute instructions included within distributed ledger data and generate an element of the distributed ledger data that associates the portions of the biometric data and the one or more hash values with the public cryptographic key.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

BRIEF DESCRIPTION OF THE DRAWINGS

FIG. 1 is a diagram of an exemplary computing environment, consistent with the disclosed embodiments.

DETAILED DESCRIPTION

Figure 2A:
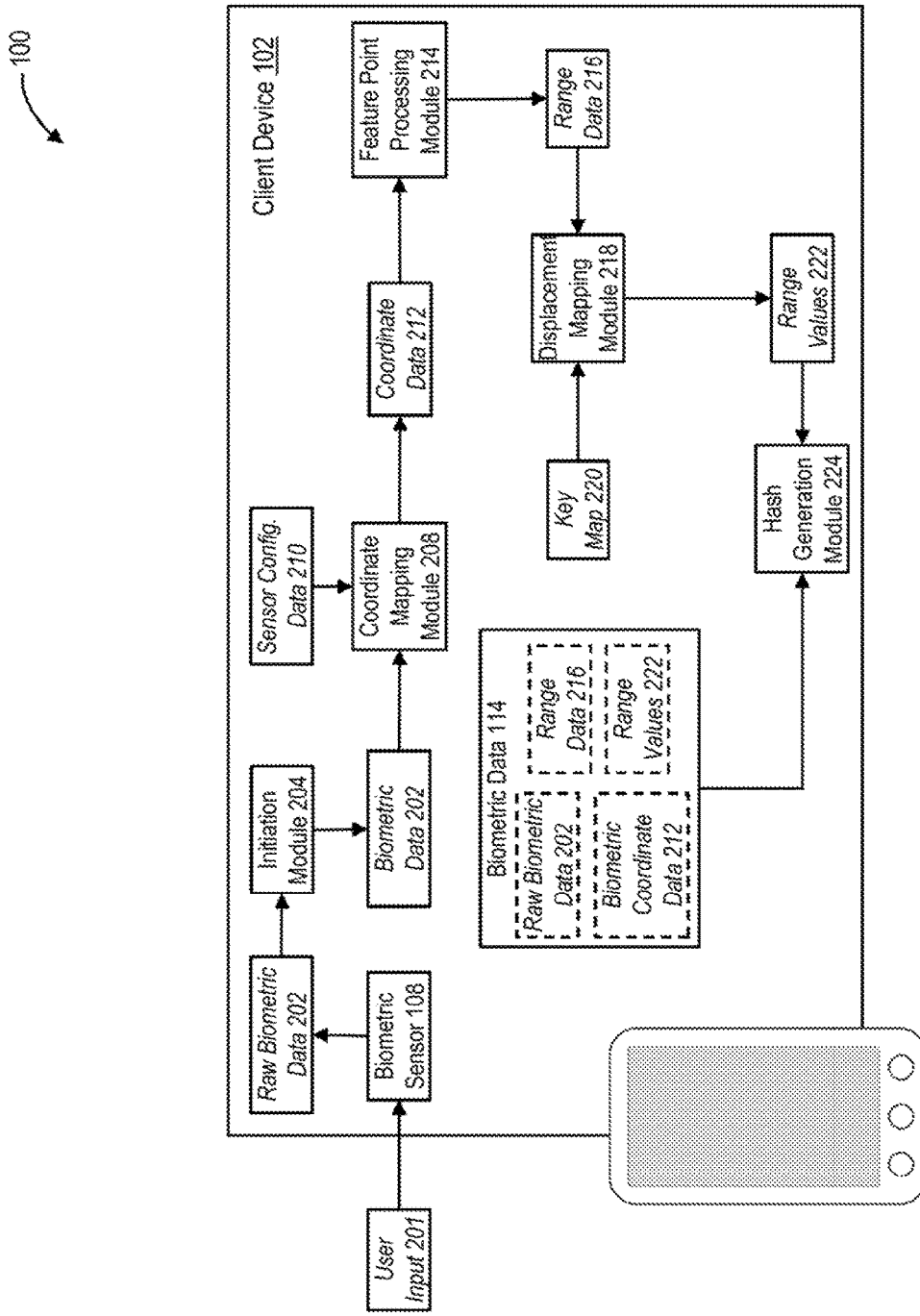
FIG. 2A is a diagram illustrating portions of an exemplary computing environment, consistent with the disclosed embodiments.

Reference will now be made in detail to the disclosed embodiments, examples of which are illustrated in the accompanying drawings. The same reference numbers in the drawings and this disclosure are intended to refer to the same or like elements, components, and/or parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only and are not to be construed as limiting the described subject matter.

I. Exemplary Computing Environments

FIG. 1 is a diagram illustrating an exemplary computing environment 100, consistent with certain disclosed embodiments. As illustrated in FIG. 1, environment 100 may include one or more client devices, such as client devices 102 and 104, and one or more node systems 130, such as node system 132, each of which may be interconnected through any appropriate combination of communications networks, such as network 120.

Examples of network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet. In some instances, the devices and systems operating within environment 100 may perform operations that establish and maintain one or more secure channels of communication across network 120, such as, but not limited to, a transport layer security (TSL) channel, a secure socket layer (SSL) channel, or any other suitable secure communication channel.

In an exemplary embodiment, client device 102 may be operated by a corresponding user, such as user 101, and may include a computing device having one or more tangible, non-transitory memories that store data and/or software instructions, and one or more processors, e.g., processor 104, configured to execute the software instructions. The one or more tangible, non-transitory memories may, in some aspects, store software applications, application modules, and other elements of code executable by the one or more processors, e.g., within application repository 105.

For example, as illustrated in FIG. 1, client device 102 may maintain, within application repository 105, a decentralized authentication engine 106 that, when executed by processor 104, performs any of the exemplary processes described herein to authenticate an identity of user 101 based on biometric information maintained securely and immutably within discrete ledger blocks of a distributed ledger data structure (e.g., a blockchain ledger or another appropriate ledger structure). In some instances, the biometric information may include, but is not limited to, fingerprint data that characterizes one or more fingerprints of user 101, ocular data that identifies or characterizes a retina or an iris of an eye of user 101, or postural data that characterizes a posture or a gate of user 101 at rest or in motion. The disclosed embodiments are, however, not limited to these exemplary elements of biometric information, and in other instance, the biometric information may include data identifying and characterizing any additional or alternate biometric characteristic or feature of user 101, such as facial data that includes one or more facial images of user 101.

Additionally, or alternatively, biometric information may also statistical data that characterizes an outcome of an application of one or more statistical processes or transformations (e.g., an orthogonal transformation, such as a principal component analysis) to corresponding portions of the fingerprint data, the ocular data, and/or the postural data described herein. In other instances, and as described herein, the biometric information may also include one or more cryptograms or hash values derived from corresponding portions of the fingerprint data, the ocular data, and/or the postural data described herein (e.g., a hash value generated based on an application of corresponding hash function to portions of the fingerprint data and statistical data).

Further, although not illustrated in FIG. 1, application repository 105 may include one or more additional or alternate application programs that, when executed by processor 104, exchange data with decentralized authentication engine 106 through a corresponding programmatic interface, such as an application programming interface (API). By way of example, the exchanged data may characterize an outcome of the exemplary biometric authentication processes described herein, e.g., as implemented by decentralized authentication engine 106 in conjunction with node system 132, and the executed application programs may perform operations consistent with a successful, or unsuccessful, authentication of the identity of user 101. Examples of these application programs include, but are not limited to, mobile application associated with a financial institution, merchants, or other providers of digital content.

Client device 102 may also include a biometric sensor 108 coupled to processor 104 and configured to sample data (e.g., biometric data) characterizing one or more biometric characteristics of user 101 during corresponding sampling intervals. In one example, biometric sensor 108 may include an optical or capacitive fingerprint scanner configured to capture data characterizing one or more fingerprints of user 101 (e.g., portions of the fingerprint data described herein) during the corresponding sampling intervals.

Additionally, or alternatively, biometric sensor 108 may be configured to capture portions of the ocular data that identifies or characterizes the retina or the iris of user 101's eye during the corresponding sampling intervals. For instance, biometric sensor unit may include, but is not limited to, a digital camera coupled to one or more optical components that irradiate user 101's eye with radiation having a particular wavelength of range of wavelengths (e.g., low-energy near-infrared radiation to scan user 101 iris, or low-energy infrared radiation to scan user 101's retina). Further, in other instances, biometric sensor 108 may also include one or more motion sensors or accelerometers that, collectively, capture portions of the postural data characterizing the posture or gait of user 101 during the corresponding sampling intervals.

The disclosed embodiments are not limited to these examples of biometric sensors, and in other instances, biometric sensor 108 may incorporate any additional or alternate biometric sensor capable of capturing data that characterizes one or more biometric characteristics of user 101, such as, but not limited to, a digital camera coupled to processor 104 and configured to capture digital images of user 101's face. Further, in some examples (not illustrated in FIG. 1), client device 102 establish communications with an external biometric sensor unit, which may capture and data characterizing the one or more biometric characteristics of user 101. In some instances, the external biometric sensor unit may perform operations that transmit portions of the captured biometric sensor data across network 120 to client device 102 (e.g., using NFC protocols, Bluetooth™ communications protocols, etc.), at regular or predetermined intervals, or in response to a detection of certain triggering events, such as a determined disposition of client device 102 within a particular geographic region or virtual boundary.

Referring back to FIG. 1, client device 102 may also establish and maintain, within the one or more tangible, non-tangible memories, one or more structured or unstructured data repositories or databases, e.g., data repository 110, that include device data 111 and application data 112. In some instances, device data 111 may include one or more unique network identifiers of client device 102, such as, but not limited to, an IP or MAC address assigned to client device 102. Further, application data 112 may include information that facilitates a performance of operations by the one or more executable application programs maintained within application repository 105, such as distributed authentication engine 106.

For example, application data 112 may include biometric data 114, which maintains portions of the sampled biometric data (e.g., the fingerprint, ocular, or postural data described herein) along with temporal data characterizing the corresponding sampling intervals. Further, application data 112 may also include cryptographic data 116 that, in some instances, maintains a cryptographic key pair (e.g., a public cryptographic key and a corresponding private cryptographic key) generated by decentralized authentication engine 106 using any of the exemplary processes described herein. In additional instances, application data 112 may include engine data 118, which includes information that supports the exemplary processes performed by decentralized authentication engine 106, as described herein.

Examples of the supporting information include, but are not limited to, data specifying one or more key-generation algorithms for computing the public or private cryptographic keys described herein, data supporting the application of the statistical processes or transformations described herein (e.g., the principal component analysis of portions of the fingerprint, ocular, and/or postural data, etc.), and data specifying and the supporting the generation of the cryptograms or hash functions that represent the portions of the fingerprint, ocular, and/or postural data (e.g., a hash function suitable for application to the portions of the biometric data). In other instances, the supporting information maintained within engine data 118 may include one or more mapping functions, or "key maps," that map ranges of biometric data, or ranges of values derived from the biometric data, to corresponding integer or fractional values. The disclosed embodiments are, however, not limited to these examples of application data, and in other instances, application data 112 may include any additional or alternate elements of data that facilitates the execution or, or the performance of operations by, distributed authentication engine 106.

Further, in some instances, client device 102 may also include a display unit 119A configured to present interface elements to user 101, and an input unit 119B configured to receive input from user 101. By way of example, display unit 119A may include, but is not limited to, an LCD display unit or other appropriate type of display unit, and input unit 119B may include, but input not limited to, a keypad, keyboard, touchscreen, voice activated control technologies, or appropriate type of input unit. Further, in additional aspects (not depicted in FIG. 1), the functionalities of display unit 119A and input unit 119B may be combined into a single device, e.g., a pressure-sensitive touchscreen display unit that presents interface elements and receives input from user 101. In some examples, biometric sensor 108 may also be incorporated into a corresponding portion of the pressure-sensitive touchscreen display unit (not illustrated in FIG. 1). Client device 102 may also include a communications unit 119C, such as a wireless transceiver device, coupled to processor 104 and configured by processor 104 to establish and maintain communications with network 120 using any of the communications protocols described herein.

As described herein, environment 100 may also include one or more additional client devices, such as client device 122, operated by user 101 or by other users. Client device 122 may also include a computing device having one or more tangible, non-transitory memories that store data and/or software instructions, and one or more processors configured to execute the software instructions. The one or more tangible, non-transitory memories may, in some aspects, store software applications, application modules, and other elements of code executable by the one or more processors, such as, but not limited to, decentralized authentication engine 106 and other of the exemplary application programs described herein. Further, client device 122 may also include one or more of the exemplary biometric sensors described herein (e.g., biometric sensor 108 of client device 102), and client device 122 may establish and maintain, within the one or more tangible, non-transitory memories, one or more data repositories, the structured or unstructured data records of which may include any of the exemplary elements of device data, application data, cryptographic data, of engine data described herein.

Examples of client device 102 or 122 may include, but are not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations, and/or display information on an interface module, consistent with disclosed embodiments. In some instances, user 101 may operate client device 102 or client device 122, and may do so to cause client device 102 or client device 122 to perform one or more operations consistent with the disclosed embodiments.

Referring back to FIG. 1, each of node system 130, such as, but not limited to, node system 132, may correspond to a computing system that includes one or more servers and tangible, non-transitory memory devices storing executable code and application modules. The servers may, for example, each include one or more processor-based computing devices, which may be configured to execute portions of the stored code or application modules to perform operations consistent with the disclosed embodiments. In some instances, and consistent with the disclosed embodiments, one or more of node systems 130 (e.g., node system 132) may correspond to a distributed system that includes computing components distributed across one or more networks, such as network 120, or other networks, such as those provided or maintained by cloud-service providers.

For example, node system 132 may establish and maintain, within the one or more tangible, non-tangible memories, one or more structured or unstructured data repositories or databases, such as data repository 142. In certain aspects, data repository 142 may include ledger data 144 that maintains a local copy of a cryptographically secure distributed-ledger data structure, such as a permissioned blockchain ledger accessible to each of node systems 130 (e.g., which collectively establish a permissioned blockchain network). For example, the permissioned blockchain ledger may include one or more ledger blocks (e.g., biometric authentication blocks 146) that immutably record and track elements of reference biometric authentication data that uniquely identify and characterize a user of client devices 102 or 122, such as user 101, and users of other network-connected devices and computing systems operating within environment 100 (not illustrated in FIG. 1).

Biometric authentication blocks 146 may also associate each of the elements of biometric authentication data with a corresponding user through a unique public cryptographic key generated by an application program, such as a distributed authentication engine 106, executed by a network-connected device or system operated by that user. For instance, a subset of the elements of biometric authentication data maintained within biometric authentication blocks 146 may uniquely identify and characterize user 101, and may be associated with a corresponding public cryptographic key assigned to user 101 by decentralized authentication engine 106, e.g., upon execution by client device 102.

In additional instances, the permissioned blockchain ledger may also include one or more ledger blocks that maintain executable elements of code, such as software modules or executable scripts, that, when executed by the node system 132 in conjunction with supporting data, perform operations consistent with a distributed smart contract (e.g., smart contract ledger blocks 148. By way of example, smart contract ledger blocks 148 may include a management module 148A that, when executed by node system 132 (e.g., by one or more processors or through an instantiated virtual machine), performs operations that securely manage the establishment and subsequent distribution of the elements of the biometric authentication data, e.g., as maintained within biometric authentication blocks 146, to network-connected devices and systems during implementation of any of the exemplary biometric authentication processes describe herein.

Smart contract ledger blocks 148 may also include data 148B that supports the maintenance and distribution operations performed by management module 148A. Examples of supporting data 148B may include, but are not limited to: data identifying those network-connected devices and systems that participate in the permissioned blockchain ledger and this, that participate in the distributed smart contract (e.g., IP addresses or MAC addresses of client devices 102 and 122, and additionally, or alternatively, of other ones of node systems 130); a public cryptographic key associated with the distributed smart contract, which may be provided to each of the client devices 102 and 122, e.g., through a secure programmatic interface established by executed decentralized authentication engine 106; and a private cryptographic key leveraged by management module 148A to digitally sign generated or output data.

II. Exemplary Computer-Implemented Processes for Dynamically Authenticating User Identity Based on Biometric Authentication Data Maintained within Distributed Ledger Data As described herein, a client device operating within environment 100, such as client device 102, may execute an application program, such as decentralized authentication engine 106 maintained within application repository 105. Upon execution by client device 102, decentralized authentication engine 106 may perform any of the exemplary processes described to authenticate an identity of an operator of client device 102, such as user 101, based on elements of biometric authentication data maintained within discrete ledger blocks of a permissioned distributed ledger data structure, such as the permissioned blockchain ledger described herein.

By way of example, decentralized authentication engine 106 may provide data indicative of an outcome of the exemplary decentralized biometric authentication processes described herein to an operating system executed client device 102, and additionally, or alternatively, to one or more additional application programs executed by client device 102, e.g., as maintained within application repository 105, through a secure programmatic interface, such as an application programming interface (API). In some instances, the executed operating system may elect to modify an operational or function state of client device 102 in response to a successful authentication of user 101 (e.g., the operating system may "unlock" client device 102 in response to the successful authentication), or may grant user 101 access to one or more functionalities of client device 102 (e.g., to connect to a wireless network, to update the operating system, etc.). In other instances, the one or more executed additional application programs, e.g., a mobile application associated with a financial institution or content provider, may receive the outcome data through the corresponding API, and based on a successful authentication of the user 101's identity, provide user 101 access to a corresponding digital portal and to application-specific data.

In some embodiments, client device 102 may perform additional operations that, in conjunction with node systems 130, enroll user 101 as a participant in the exemplary decentralizes biometric authentication processes described herein, e.g., by incorporating elements of reference biometric authentication data that identify and characterize user 101 into a new ledger block of the permissioned blockchain ledger. For example, and to initiate the enrollment process, user 101 may provide input to client device 102 (e.g., via input unit 119B), which causes client device 102 to execute decentralized authentication engine 106 (e.g., as maintained within application data store 105). Upon execution by client device 102, decentralized authentication engine 106 may perform operations that generate a pair of public and private cryptographic keys for user 101 (e.g., based on portions of engine data 118 that specify one or more key-generation algorithms), and that store the generated public and private cryptographic keys within a corresponding portion of data repository 110, e.g., within cryptographic data 116.

As described herein, the public cryptographic key may uniquely associate user 101 with corresponding elements of reference biometric authentication data maintained securely within the permissioned blockchain ledger (e.g., within biometric authentication blocks 146 of ledger data 144), and further, decentralized authentication engine 106 may perform operations that generate and apply a digital signature to additional elements of reference biometric authentication data prior to transmission to one or more of node systems 130, e.g., node system 132, for validation and incorporation into a new ledger block of the permissioned blockchain ledger. Further, and in some examples, decentralized authentication engine 106 may cause client device 102 to perform operations that broadcast the generated public cryptographic key across network 120 to the one or more node systems 130, along with an identifier of client device 102 (e.g., an assigned IP or MAC address) and/or of the distributed smart contract maintained within the permissioned blockchain ledger (e.g., the public cryptographic key of the distributed smart contract established by smart contract ledger blocks 148).

For instance, node system 132 may receive the public cryptographic key assigned to user 101, the identifier of client device 102, and additionally, or alternatively, the identifier of the distributed smart contract, e.g., the contract public key described herein). In response to the received contract public key, node system 132 may access smart contract ledger blocks 148 and execute management module 148A, which may perform operations that incorporate the public cryptographic key of user 101 and, in some instances, the identifier of client device 102, within a corresponding portion of supporting data 148B. By way of example, and without limitation, node system 132, in conjunction with and additional or alternate ones of node system 130, may perform any of the consensus-based operations described herein to validate and incorporate the public cryptographic key of user 101 and/or the identifier of client device 102 within a ledger block of the permissioned blockchain ledger (e.g., within a new ledger block maintained within ledger data 144).

In other instances, and responsive to the generation, storage, and distribution of the public cryptographic key, and to the storage of the private cryptographic key, decentralized authentication engine 106 may cause client device 102 to present, on display unit 119A, a graphical user interface (GUI) that prompts user 101 to initiate the enrollment process and provide biometric input to client device 102, e.g., via biometric sensor 108. For example, and as described herein, biometric sensor 108 may include an optical or capacitive fingerprint scanner configured to capture one or more fingerprints of user 101, e.g., a thumbprint, during corresponding sampling intervals. In response to the presented GUI, user 101 may engage biometric sensor 108, e.g., by placing a portion of a thumb onto a surface of the optical or capacitive fingerprint scanner, and biometric sensor 108 may detect user input, e.g., user input 201 of FIG. 1, that initiates a capture of biometric data that identifies user 101.

Referring to FIG. 2A, biometric sensor 108 may detect user input 201, e.g., the disposition of the thumb onto the surface of the optical or capacitive fingerprint scanner and may perform operations that capture biometric data 202 at discrete times during a corresponding sampling interval. For example, biometric data 202 may include sensor data that specifies one or more thumbprints of user 101 captured during the corresponding sampling interval (e.g., information characterizing electrical charges obtained from an array of capacitors that collectively establish the capacitive fingerprint scanner, etc.), along with temporal information that specifies the time at which biometric sensor 108 captured each of the thumbprints.

Biometric sensor 108 may also provide biometric data 202 as an input to an initiation module 204 of decentralized authentication engine 106 (e.g., as executed by client device 102 using any of the exemplary processes described herein), and initiation module 204 may perform operations that store all or a portion of biometric data 202 within one or more tangible, non-transitory memories, e.g., within biometric data 114. Further, and as described herein, initiation module 204 may also provide biometric data 202 as an input to an encoding module 206 of executed decentralized authentication engine 106.

In some examples, encoding module 206 may perform any of the exemplary processes described herein that map portions of biometric data 202 that correspond to each of the sampled thumbprints to a physical coordinate space associated with biometric sensor 108 (e.g., a spatial coordinate system, such as Cartesian coordinates or polar coordinates having an origin on the surface of biometric sensor 108). By mapping the sampled thumbprints to the physical coordinate space, encoding module 206 may generate sample coordinate data that correlates each elements of biometric data 202 to a corresponding spatial position on the surface of biometric sensor 108.

Further, and as described herein, encoding module 206 may perform additional operations that identify the spatial coordinates specifying one or more feature points disposed within each of the captured thumbprints, and that compute, for each feature point within the captured thumbprint samples, a range of displacements between that feature point and each of the other feature points within the captured thumbprint samples (e.g., by "overlaying" all or a portion of the captured thumbprint samples within the physical coordinate space described herein). Encoding module 206 may also perform operations that apply one or more mapping functions (e.g., a corresponding key map) to the each of the displacement ranges to generate a range value that characterizes the displacement range between each pair of feature points within the captured thumbprint samples. For example, the applied mapping function (e.g., the key map) may map ranges of actual, non-integer (e.g., fractional or decimal) displacements into normalized or relative integer values, which may characterize and expected displacement between each of the pairs of feature points within thumbprint samples captured by sensors and sensor units of various type and geometry.

Additionally, or alternatively, encoding module 206 may also apply one or more statistical algorithms or transformations to portions of the generated coordinate data to generate transformed coordinate data. For example, encoding engine 206 may apply a principal component analysis (PCA) to the coordinate data (e.g., which also specifies the spatial coordinates of the feature points within the captured thumbprint samples), to generate transformed coordinate data that specifies transformed spatial coordinates of the feature points within a transformed coordinate space. In some instances, encoding engine 206 may perform any of the exemplary processes described herein to compute, for each of the feature points, a range of transformed displacements between that feature point and each of the other feature points within the captured thumbprint samples (e.g., by "overlaying" all or a portion of the captured thumbprint samples within the transformed coordinate space described herein, and to map each of the displacement ranges to a corresponding transformed range value (e.g., based on the corresponding key map).

Further, in some instances, encoding module 206 may perform additional operations that generate a cryptogram or hash value representative of the coordinate data for the captured thumbprints (e.g., which also specifies the spatial coordinates of the feature points within the captured thumbprint samples), the range values (e.g., based the computed displacements between the pairs of feature points in the physical coordinate space) and the transformed range values (e.g., based on the transformed displacements between the pairs of feature points). For example, and as described herein, encoding module 206 may provide all of a portion of the sample coordinate data, the range values, and the transformed range values as inputs to a corresponding hash function, which may generate a hash value of predetermined length and composition that represents the coordinate data, the range values, and the transformed range values.

Referring back to FIG. 2A, a coordinate mapping module 208 of encoding module 206 may receive biometric data 202, and may access and extract sensor configuration data 210 from one or more tangible, non-transitory memories (e.g., from a portion of engine data 118). In some instances, sensor configuration data 210 may identify sensor type that characterizes biometric sensor 108 (e.g., a capacitive fingerprint scanner composed of an array of discrete capacitor units) and correlation data that, when processed by coordinate mapping module 208, facilitates a mapping of each element of biometric data 202 to a corresponding spatial position along the surface of biometric sensor 108.

For example, the sensor configuration data 210 may specify that the capacitive fingerprint scanner has a circular surface having a particular radius and geometry/and may include correlation data that maps each of the array of capacitor units to spatial coordinates established relative to the center (e.g., to corresponding radial and angular coordinates in a polar coordinate system anchored at the sensor center). The disclosed embodiments are, however, not limited to these examples of sensor geometry or correlation data, and in other instances, sensor configuration data 210 may specify any additional or alternate geometry or type of biometric sensor 108, and any additional or alternate set of correlation data appropriate to that sensor geometry or type, such as correlation data based on a Cartesian coordinate system.

In some instances, coordinate mapping module 208 may perform operations that apply the correlation data to elements of biometric data 202, and map each of the elements of biometric data 202 to a corresponding spatial position, and a corresponding set of spatial coordinates, on the surface of the capacitive fingerprint scanner (e.g., included within biometric sensor 108). By way of example, and without limitation, each of the elements of biometric data 202 may correspond to an electrical charge measured at a capacitor unit of the capacitive fingerprint sensor, and based on portions of sensor configuration data 210, coordinate mapping module 208 may determine a radial and angular position of each capacitor unit, and as such each element of biometric data 202, along the surface of the capacitive fingerprint sensor.

Coordinate mapping module 208 may perform operations that generate coordinate data 212, which includes each element of raw biometric data 202 and its corresponding spatial coordinates (e.g., the corresponding radial and angular position along the surface of the capacitive fingerprint sensor), and that store biometric coordinate data 212 within one or more tangible, non-transitory memories, e.g., within biometric data 112. Further, in some instances, coordinate mapping module 208 may provide biometric coordinate data 212 as an input to a feature point processing module 214 of encoding module 206, which may perform any of the exemplary processes described herein to identify one or more feature points within each of the captured thumbprint samples, to determine the spatial coordinates that characterize each of the one or more feature points based on biometric coordinate data 212, and to compute, for each of the feature points, a range of displacements between that feature point and each of the other feature points within the captured thumbprint samples (e.g., by "overlaying" all or a portion of the captured thumbprint samples within the physical coordinate space described herein).

Figure 2B:
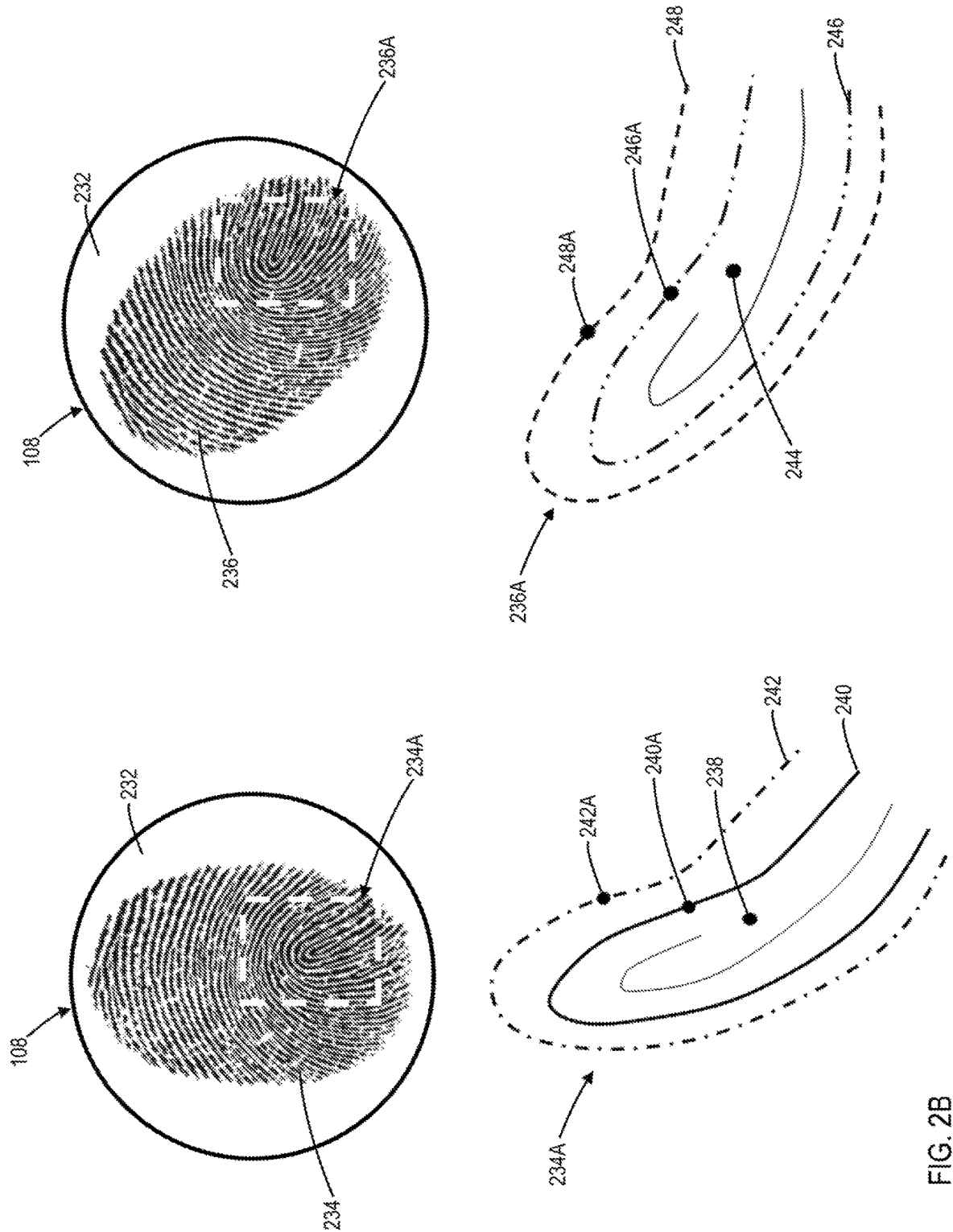
FIGS. 2B and 2C are diagrams illustrating exemplary elements of biometric data, consistent with the disclosed embodiments.

As described herein, biometric coordinate data 212 may assign spatial coordinates to each of the elements of raw biometric data 202, which collectively characterize a plurality of thumbprint samples captured during a corresponding sampling interval. For example, as illustrated in FIG. 2B, the plurality of thumbprint samples may include, but are not limited to, thumbprint samples 234 and 236, which corresponding, respectively, to a disposition of user 101's thumb at corresponding positions along a surface 232 of biometric sensor 108. In some instances, each of the captured thumbprint samples (such as thumbprint samples 234 and 236) may be characterized and identified by the spatial coordinates of one or more feature points that include, but are not limited to, a center or centroid of each captured thumbprint sample, one or more discrete points along a first ridge line that surrounds the center of centroid, one or more discrete points along a second ridge line that surrounds the first ridge line, and any additional or alternate feature points that would be appropriate to, and capable of identifying, the captured thumbprint images.

For example, as illustrated in FIG. 2B, portion 234A of thumbprint 234 may include a center point 238 of thumbprint 234, one or more points disposed along a first ridge line 240 of thumbprint 234 (e.g., first ridge point 240A), and one or more points disposed along a second ridge line 242 of thumbprint 234 (e.g., second ridge point 242A). As further illustrated in FIG. 2B, portion 236A of thumbprint 236 may include a center point 244 of thumbprint 236, one or more points disposed along a first ridge line 246 of thumbprint 236 (e.g., first ridge point 246A), and one or more points disposed along a second ridge line 248 of thumbprint 236 (e.g., second ridge point 248A). The disclosed embodiments are, however, not limited to this exemplary number of captured thumbprints, or to these examples of feature points, and in other instances, biometric coordinate data 212 may characterize any additional or alternate number of captured thumbprint samples that include any additional or alternate type of number of feature points.

Referring back to FIG. 2A, feature point processing module 214 may perform operations that identify each of the feature points that characterize the captured thumbprint images (e.g., the center points or centroids, the discrete points along the first ridge lines, the discrete points along the second ridge lines, etc.). Further, and based on portions of biometric coordinate data 212, feature point processing module 214 may also determine spatial coordinates (e.g., radial and angular positions) that define a spatial position of each of the feature points along the surface of biometric sensor 108 for each of the captured thumbprint samples.

In some instances, however, a variation in device orientation or movement during a corresponding sampling interval may induce a variation in a position of user's 101 thumb along the surface of the capacitive fingerprint scanner (e.g., as incorporated within biometric sensor 108) during the corresponding sampling interval. As such, the spatial positions of the one or more of the feature points along the scanner surface may vary between each of the captured thumbprint samples. Moreover, due to changes in applied pressure or an occurrence of certain environmental conditions (e.g., moisture on the scanner surface due to precipitation or relative humidity), a relative positioning of the feature points within each of the captured thumbprint images may vary throughout the corresponding sampling interval.

Figure 2C:
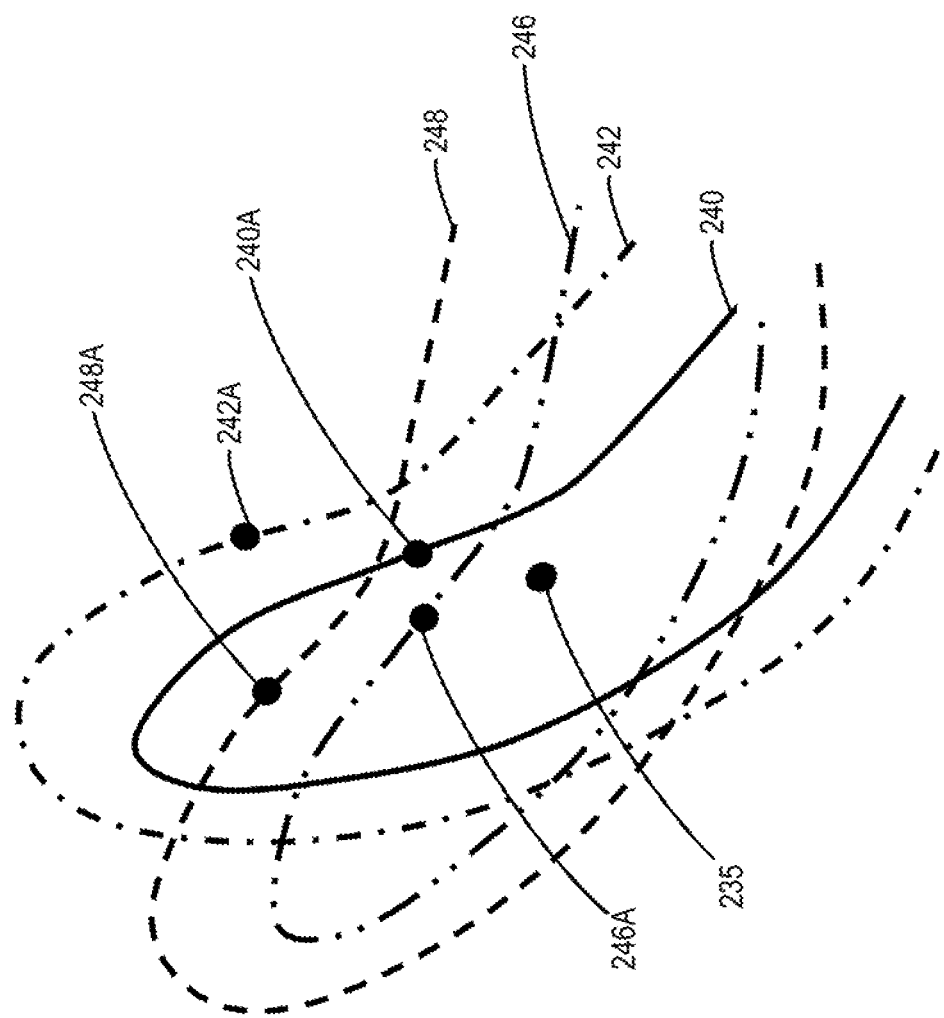

To account for these potential variations, feature point processing module 214 may perform operations that compute, for each feature point within the captured thumbprint samples, a range of displacements between that feature point and each of the other feature points within the captured thumbprint samples, e.g., by "overlaying" all or a portion of the captured thumbprint samples within the physical coordinate space described herein. For example, as illustrated in FIG. 2C, feature point processing module 214 may perform operations that overlay all or a portion of captured thumbprints 234 and 236 (e.g., portions 234A and 236A of FIG. 2B) such that center points 238 and 244 share a common center-point spatial position, e.g., position 235. Further, feature point processing module 214 may compute, for each of the overlaid thumbprint samples, a displacement between the center point and each point along the corresponding first ridge line, and a displacement between the center point and each point along the corresponding second ridge line.

For example, as illustrated in FIG. 2C, feature point processing module 214 may compute a displacement between position 235 and point 240A along first ridge line 240, and a displacement between position 235 and point 246A along first ridge line 246. In some instances, these computed displacements (and further computed displacements between position 235 and additional, or alternate, points along first ridge lines 240 and 246) may establish an expected range of displacement expected between the center point and a point along the first ridge line of a thumbprint of user 101.

In additional examples, also illustrated in FIG. 2C, feature point processing module 214 may compute a displacement between position 235 and point 242A along second ridge line 242, and a displacement between position 235 and point 248A along second ridge line 248. These computed displacements (and further computed displacements between position 235 and additional, or alternate, points along second ridge lines 242 and 2468) may establish an expected range of displacement expected between the center point and a point along the second ridge line of a thumbprint of user 101. The disclosed embodiments are, however, not limited to these exemplary pairs of feature points, and in other instances, feature point processing module 214 may compute displacements between any additional or alternate pair of feature points within the captured thumbprint samples, such as a displacement between discrete points along the first and second ridge lines.

Referring back to FIG. 2A, feature point processing module 214 may generate range data 216 that specifies the established range of displacements between each of the feature-point pairs within the captured thumbprint data. Further, feature point processing module 214 may provide range data 216 and an input to a displacement mapping module 218 of encoding module 206. In some instances, displacement mapping module 218 receive range data 216, which specifies the established range of displacements that characterizes each of the pairs of feature points and may perform additional operations that apply one or more range mapping functions to portions of range data 216.

For example, displacement mapping module 218 may extract, from one or more tangible, non-transitory memories (e.g., from engine data 118), key map data 220 that identifies and characterizes the one or more range mapping functions, such as, but not limited to, a key mapping function appropriate to the captured thumbprint samples, and displacement mapping module 218 may apply the one or more range mapping functions to the each of the displacement ranges (e.g., as specified within range data 216) to generate a range value indicate of a magnitude of the established range of displacements between each pair of feature points within captured thumbprint samples.

In some examples, the application of the range mapping function to portions of range data 216 may map ranges of actual, non-integer (e.g., fractional or decimal) displacements into normalized or relative integer values, which may characterize an expected displacement between each of the pairs of feature points within additional thumbprint samples captured by sensors and sensor units of various type and geometry. Displacement mapping module 218 may perform operations that package the generated range values, and in some instances, the spatial positions of the feature points associated with corresponding ones of the displacement range values, into range value data 222, which displacement mapping module 218 may store within one or more tangible, non-transitory memories, e.g., within a portion of biometric data 114. Displacement mapping module 218 may also provide all or a portion of range value data 222 as an input to a hash generation module 224 of encoding module 206.

Figure 2D:
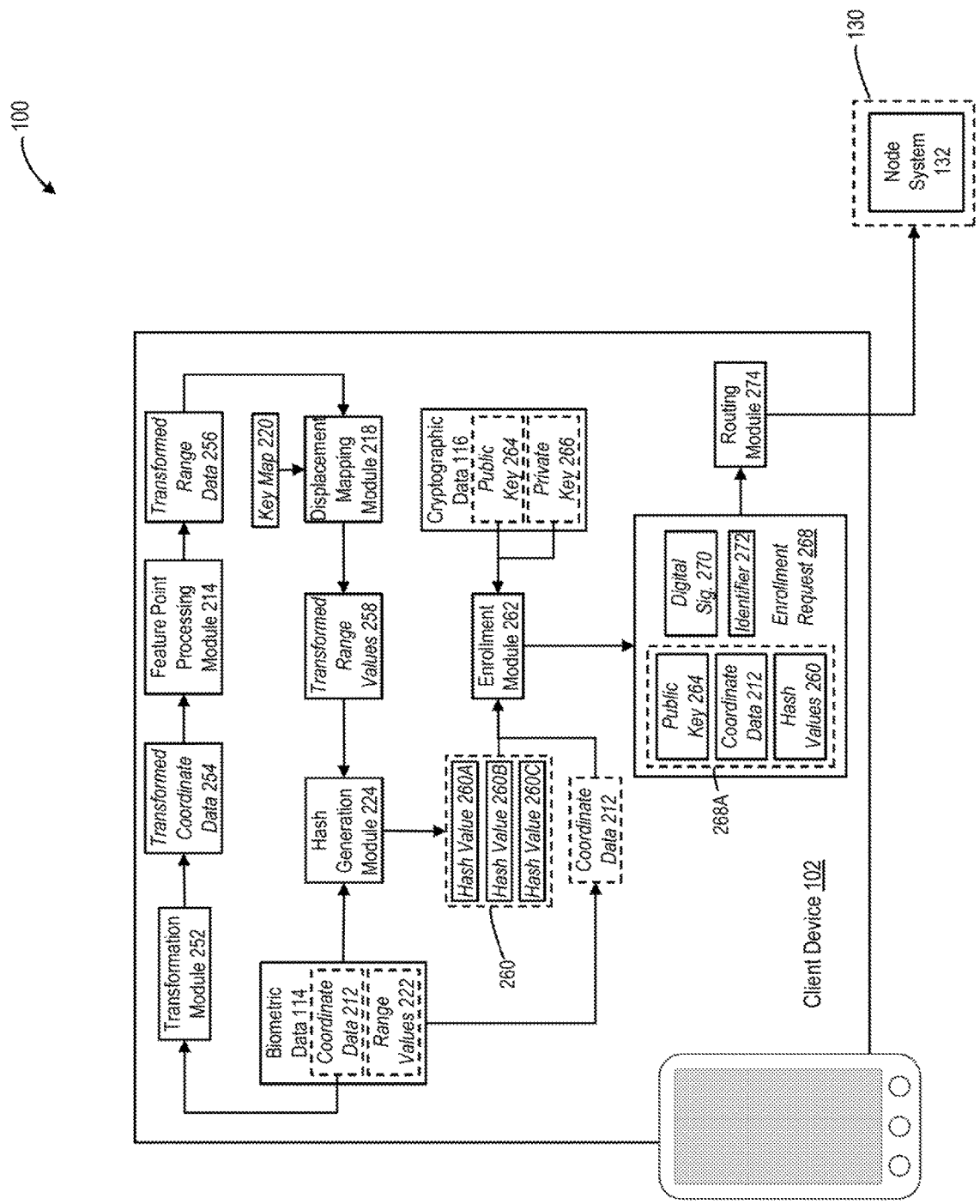
FIGS. 2D, 2E, 3A, and 3B are diagrams illustrating portions of an exemplary computing environment, consistent with the disclosed embodiments.

Further, and as described herein, encoding module 206 may also perform operations that apply one or more statistical algorithms or transformations to portions of biometric coordinate data 212, e.g., to generate transformed biometric coordinate data that maps elements of raw biometric data 202 not to a physical coordinate space, but instead to a transformed coordinate space associated with the applied statistical algorithms or transformations. Referring to FIG. 2D, a transformation module 252 of encoding module 206 may receive coordinate data 212, e.g., from coordinate mapping module 208, and may perform operations that a principal component analysis (PCA) to the portions of biometric coordinate data 212, e.g., that specifies the spatial coordinates of the elements of biometric data 202.

Based the application of the principal component analysis to the portions of biometric coordinate data 212, transformation module 252 may generate transformed coordinate data 254 that maps elements of biometric data 202 (including the feature points within the captured thumbprint data) to corresponding sets of transformed coordinates of a transformed coordinate space (e.g., an eigenvalue space associated with the principal component analysis). The disclosed embodiments are, however, not limited to an application of the principal component analysis to the portions of biometric coordinate data 212, and in other instances, transformation module 252 may apply any additional or alternate transformation or statistical process to the portions of biometric coordinate data 212, including additional, or alternate, orthogonal or non-orthogonal transformations.

Transformation module 252 may provide transformed coordinate data 254, which reflects the application of the principal components analysis to the portions of biometric coordinate data 212, as an input to feature point processing module 214 of encoding module 206. In some instances, feature point processing module 214 may receive transformed coordinate data 254, and may perform any of the exemplary processes described herein to identify one or more feature points within each of the captured thumbprint samples, to determine the spatial coordinates that characterize each of the one or more feature points based on transformed coordinate data 254, and to compute, for each of the feature points, a range of displacements between that feature point and each of the other feature points within the captured thumbprint samples (e.g., by "overlaying" all or a portion of the captured thumbprint samples within the transformed coordinate space described herein). For example, feature point processing module 214 may generate transformed range data 256 that identifies and characterizes, for each feature point within the captured thumbprint samples, a range of displacements in the transformed coordinate space between that feature point and each of the other feature points within the captured thumbprint samples, and may provide transformed range data 256 as an input to displacement mapping module 218 of encoding module 206.

In some instances, displacement mapping module 218 receive transformed range data 256, which identifies and characterizes the displacement ranges associated with each of the feature points within the transformed coordinate space. Displacement mapping module 218 may perform any of the exemplary processes described above to apply the one or more range mapping functions (e.g., as specified within key map data 220) to portions of transformed range data 256, and to generate corresponding range values that characterizes the displacement ranges, in the transformed coordinate space, between each pair of feature points within captured thumbprint samples (e.g., transformed range values derived from the application of the principal component analysis to portions of coordinate data 212).

Displacement mapping module 218 may perform operations that package the generated transformed range values, and in some instances, the transformed coordinates of the feature points associated with corresponding ones of the transformed range values, into transformed range value data 258, which displacement mapping module 218 may store within one or more tangible, non-transitory memories, e.g., within a portion of biometric data 114. Displacement mapping module 218 may also provide all or a portion of transformed range value data 258 as an input to a hash generation module 224 of encoding module 206.

Hash generation module 224 may receive transformed range value data 258, and may perform operations that access and extract, from one or more tangible, non-transitory memories (e.g., from a portion of biometric data 114), coordinate data 212 and range value data 222, as described herein. In some examples, hash generation module 224 may apply one or more hash functions to all or a portion of biometric coordinate data 212, range value data 222, and transformed range value data 258, and generate corresponding hash values 260 that represents biometric coordinate data 212 (e.g., hash value 260A), range value data 222 (e.g., hash value 260B), and transformed range value data 258 (e.g., hash value 260C). In other examples, not illustrated in FIG. 2D, hash generation module 224 may generate a single hash value that collectively represents biometric coordinate data 212, range value data 222, and transformed range value data 258, and additionally, or alternatively, multiple hash values that, respectively, represent subsets of biometric coordinate data 212, range value data 222, and transformed range value data 258.

For instance, hash generation module 224 may access engine data 118 (e.g., as maintained within one or more tangible, non-transitory memories), and extract hash function data that specifies the one or more hash functions, such as, but not limited to, an SHA-256 hash function, an SHA-384 hash function, or an SHA-512 hash function. In some instances, the application of the one or more hash functions to biometric coordinate data 212, range value data 222, and transformed range value data 258 may generate corresponding hash values, e.g., hash values 260A, 260B, and 260C, having a length or composition that is consistent with the permissioned blockchain ledger maintained and access by one or more of node systems 130, as described herein.

Hash generation module 224 may output hash values 260 to encoding module 206, which may provide hash values 260, and in some instances, biometric coordinate data 212, as an input to an enrollment module 262 of executed decentralized authentication engine 106. As illustrated in FIG. 2D, enrollment module 262 may access cryptographic data 116 (e.g., as maintained within one or more tangible, non-transitory memories), and extract a public cryptographic key 264 and a private cryptographic key 266, each of which may be generated by decentralized authentication engine 106 and assigned to user 101 using any of the exemplary processes described herein. Enrollment module 262 may perform operations that package biometric coordinate data 212 (e.g., which maps the elements of raw biometric data 202 to corresponding spatial positions along the surface of biometric sensor 108), hash values 260 (e.g., including individual hash values 260A, 260B, and 260C, as described herein), and public cryptographic key 264 (e.g., that uniquely identifies user 101 within the permissioned blockchain ledger maintained by node systems 130) into a payload portion 268A of an enrollment request 268.

Further, in some instances, enrollment module 262 may perform additional operations that generate and apply a digital signature 270 to payload 268A of enrollment request 268, e.g., using private cryptographic key 266 of user 101, and enrollment module 262. Enrollment module 262 may also package a unique identifier 272 of the distributed smart contract within the permissioned block-chain ledger (e.g., a network address associated with smart contract ledger blocks 148 of FIG. 1) within a portion of enrollment request 268. As illustrated in FIG. 2D, enrollment module 262 may perform operations that provide enrollment request 268, which includes payload 268A, digital signature 270, and contract identifier 272, as an input to a routing module 274 of client device 102. Routing module 274 may receive enrollment request 268, and may perform operations that cause client device 102 to broadcast enrollment request 268 across network 120 to each of node systems 130, such as, but not limited to, node system 132, through a secure, programmatic communications channel.

Figure 2E:
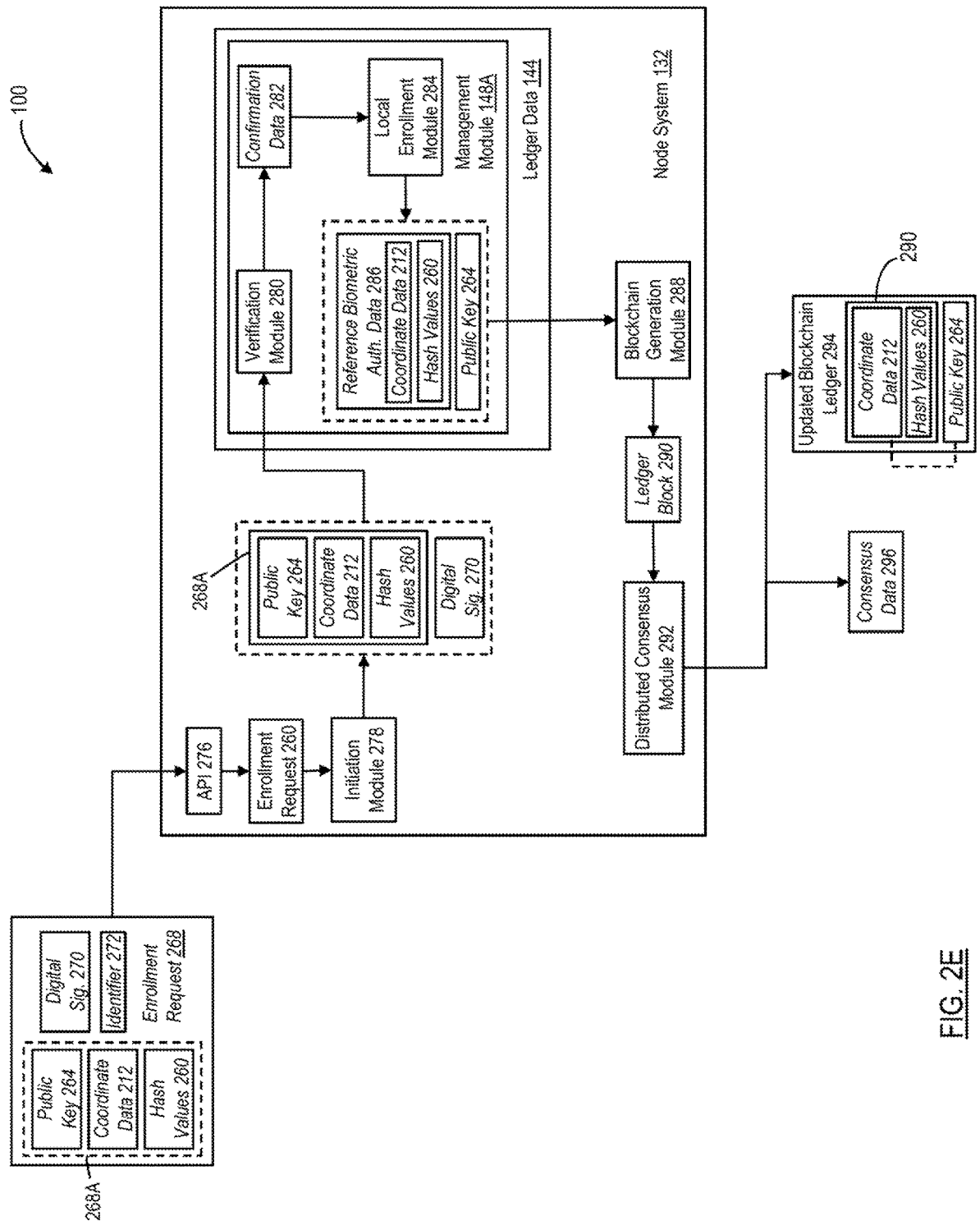

By way of example, as illustrated in FIG. 2E, node system 132 (and each additional or alternate one of node systems 130) may receive enrollment request 268 through a corresponding programmatic interface, such as application programming interface (API) 276. In some instances, API 276 may route enrollment request 268 to an initiation module 278, which may process enrollment request 268 to detect a presence of contract identifier 272, e.g., that uniquely identifies the distributed smart contract within the permissioned block-chain ledger. In some aspects, and in response to the detection of contract identifier 272, initiation module 278 may perform operations that invoke the distributed smart contract and thus, the execution of the code elements that establish the distributed smart contract, e.g., as maintained in management module 148A of smart contract ledger blocks 148. In some instances, one or more processors of node system 132 may access the permissioned blockchain ledger (e.g., as maintained within ledger data 144 of data repository 142) and execute the code elements maintained within management module 148A. In other instances, and consistent with the disclosed embodiments, node system 132 may execute an instance of a distributed virtual machine, which accesses the permissioned block-chain ledger and executes the code elements maintained within management module 148A (e.g., based on output data generated by initiation module 278).

Upon invocation of the distributed smart contract, initiation module 278 may extract payload 268A and digital signature 270 from enrollment request 268, and provide payload 268A as an input to management module 148A, which includes the executable code elements that establish the distributed smart contract. In some examples, a verification module 280 of management module 148A may receive payload 268A and digital signature 270, and perform operations that extract public cryptographic key 264 from payload 268A, and that verify digital signature 270 based on public cryptographic key 264.

In one instance, if verification module 280 were unable to verify digital signature 270, executed management module 148A may elect not to enroll user 101 as participant in the exemplary biometric authentication process described herein. In response to this election, the distributed smart contract may decline to record any elements of biometric authentication data that identify and characterize user 101, such as hash values 260 or coordinate data 212, within the permissioned block-chain ledger, and management module 148A may output data indicative of the unsuccessful verification, which node system 132 may relay back to client device 102.

Alternatively, if verification module 280 were to successfully verify digital signature 270, executed management module 148A may elect to enroll user 101 as participant in the exemplary biometric authentication process described herein, and verification module 280 may output confirmation data 282 indicative of the successful verification. In some instances, confirmation data 282 may also include public cryptographic key 264 along with hash values 260 and/or coordinate data 212 (e.g., that collectively establish reference elements of biometric authentication data for user 101), and verification module 280 may provide confirmation data 282 as an input to a local enrollment module 284, which may process portions of confirmation data 282 for submission to the permissioned block-chain ledger.

For example, local enrollment module 284 may process confirmation data 282 to extract public cryptographic key 264 and hash values 260 (and in some instances, coordinate data 212), and perform operations that generate reference biometric authentication data 286, which uniquely identifies and characterizes user 101. Reference biometric authentication data 286 may, for example, represent an output of the distributed smart contract, and in some aspects, management module 148A may output public cryptographic key 264 and reference biometric authentication data 286 to a blockchain generation module 288 of node system 132. For example, block-chain generation module 288 may perform operations that generate a new ledger block 228 that includes reference biometric authentication data 286 (e.g., each of hash values 260, and in some instances, coordinate data 212) and links reference biometric authentication data 286 to public cryptographic key 264 of user 101.

Node system 132 may perform additional operations that append to ledger block 290 to a prior version of the permissioned block-chain ledger to generate a latest, longest version of the permissioned block-chain ledger (e.g., an updated permissioned block-chain ledger 294). For example, the additional operations may be established through a distributed consensus among the other node systems operating within environment 100, and may include, but are not limited to, the calculation of an appropriate proof-of-work or proof-of-stake by a distributed consensus module 292 prior to the other node systems. In certain aspects, node system 132 may broadcast evidence of the calculated proof-of-work or proof-of-stake to the other node systems across network 120 (e.g., as consensus data 296).

Node system 132 may also broadcast updated permissioned block-chain ledger 294, which represents the latest, longest version of the permissioned block-chain ledger, to the other node systems operating within environment 100 and additionally or alternatively, to each of the network-connected systems that participate in the permissioned block-chain network, such as participant systems 152 and 172. As illustrated in FIG. 2D, updated permissioned block-chain ledger 294 may include new ledger block 290, which includes portions of reference biometric authentication data 286 that uniquely identify and characterize user 101, and are linked to public cryptographic key 264 of user 101.

Upon inclusion of ledger block 290 within updated permissioned block-chain ledger 294, user 101 may be successful enrolled in the exemplary blockchain-based, biometric authentication processes described herein. Although not illustrated in FIG. 2D, node system 132 may generate and transmit, across network 120, a confirmation of the enrollment of user 101 to client device 102, e.g., through a secure, programmatic communications channel, and decentralized authentication engine 106 may perform operations that cause client device 102 to present information indicative of the confirmed enrollment through a graphical user interface displayed on display unit 119A. Further, in some instances, decentralized authentication engine 106 may store data indicative of user 101's enrollment status (e.g., an enrollment flag) within one or more tangible, non-transitory memories, e.g., within engine data 118.

Further, and response the successful enrollment of user 101, portions of reference biometric authentication data 286 (e.g., that uniquely identify and characterize user 101) may be accessible to client device 102, and other network-connected devices or systems operated by user 101, based on authentication requests broadcast programmatically to one or more of node systems 130 by an executed application programs, such as decentralized authentication engine 106. In some examples, and as described herein, certain of the decentralized biometric authentication processes described herein, which maintain elements of biometric authentication data securely and immutably within a permissioned block-chain ledger, facilitate a secure distribution of the elements biometric authentication data across multiple application- and operating-system-specific platforms implemented by network-connected computing devices and systems operating within environment 100.

The secure cross-platform distribution of these elements of biometric authentication data, as maintained within the permissioned blockchain ledger, may align authentication processes across each of these application- and operating-system-specific platforms, and may eliminate a requirement that an operator of one or more network-connected computing devices or systems (e.g., personal or business devices) establish or enroll corresponding biometric authentication credentials on each computing device or system. Certain of these exemplary decentralized biometric authentication processes, as described herein, may be implemented in addition to, or as an alternate to, centralized biometric authentication process that establish a reference biometric sample on each computing device or system operated by a user. Further, these exemplary decentralized biometric authentication processes, as described herein, may enable network-connected computing devices having limited storage functionalities, such as wearable devices or form factors, to efficiently implement a biometric authentication of an operating user.

In some examples, and subsequent to a completion of any of the exemplary enrollment processes described herein, user 101 may provide additional input to client device 102 (e.g., via input unit 119B) that requests access to one or more device functionalities (e.g., by unlocking client device 102, etc.), or that request an execution one or more application programs, such as a mobile application associated with a financial institution. In other examples, user 101 may operate an additional or alternate network-connected computing device, such as client device 122, and may provide additional input (e.g., through a corresponding input unit) that requests access to any of the device functionalities or application programs described herein.

As described herein, and in response to the receipt of the additional input, client device 102 and additionally, or alternatively, client device 122, may execute one or more application programs, such as decentralized authentication engine 106. In some instances, decentralized authentication engine 106, when executed by client device 102 or client device 122, may perform any of the exemplary processes described herein to authenticate an identity of user 101 based a comparison between locally obtained or derived biometric authentication data and portions of additional elements of biometric authentication maintained securely within a permissioned blockchain ledger, e.g., based on request data provided to a distributed smart contract maintained within ledger blocks of the permissioned blockchain ledger.

Figure 3A:
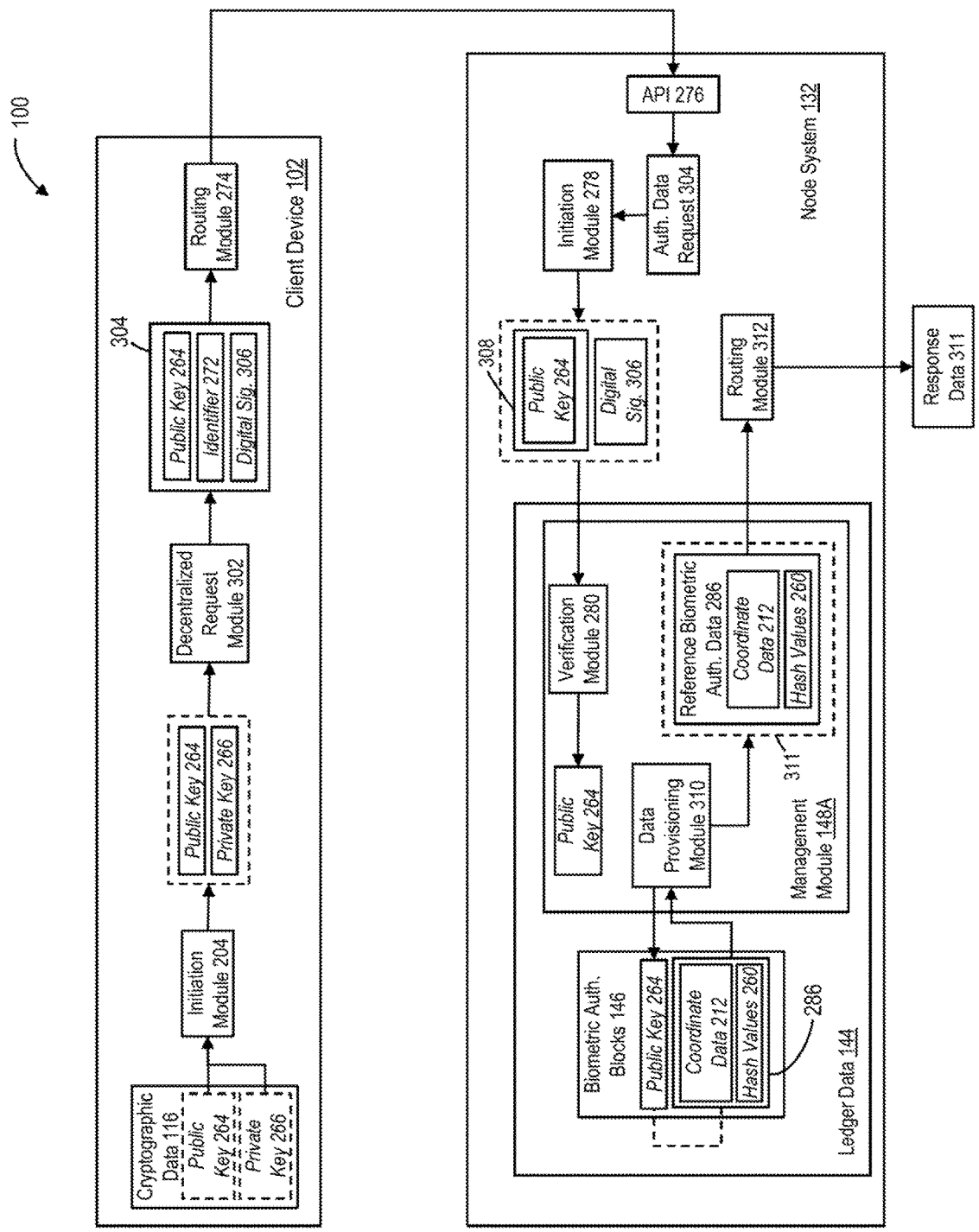

For example, and referring to FIG. 3A, client device 102 may execute decentralized authentication engine 106, which performs operations that obtain, from one or more of node systems 130, elements of biometric authentication data that identify and characterize user 101 and further, that are maintained securely within one or more ledger blocks of the permissioned blockchain ledger described herein. In some instances, initiation module 204 of executed decentralized authentication engine 106 may access cryptographic data 116 (e.g., as maintained within one or more tangible, non-transitory memories), and extract public cryptographic key 264, which elements of biometric authentication data maintained on behalf of user 101 within the permissioned block-chain ledger.

Initiation module 204 may, in some instances, provide public cryptographic key 264 as an input to a decentralized request module 302, which may perform operations that package public cryptographic key 264 into an authentication data request 304. In some instances, decentralized request module 302 may also incorporate, into portions of authentication data request 304, one or more unique identifiers of client device 102 (e.g., an IP or MAC address extracted from device data 111), and further, contract identifier 272, which uniquely identifies the distributed smart contract within the permissioned block-chain ledger (e.g., a network address associated with smart contract ledger blocks 148 of FIG. 1). Additionally, or alternatively, decentralized request module 302 may also generate and apply a digital signature 306 to all or a portion of authentication data request 304, e.g., using private cryptographic key 266 and based on any appropriate algorithm. Decentralized request module 302 may provide authentication data request 304, which includes public cryptographic key 264, contract identifier 272 (and in some instances, the device identifier), and digital signature 306, to routing module 274 of client device 102.

Routing module 274 may receive authentication data request 304 and may perform operations that cause client device 102 to broadcast authentication data request 304 across network 120 to each of node systems 130, such as, but not limited to, node system 132, through a secure, programmatic communications channel. For example, as illustrated in FIG. 3A, node system 132 (and each additional or alternate one of node systems 130) may receive authentication data request 304 through a corresponding programmatic interface, such as API 276. In some instances, API 276 may route authentication data request 304 to initiation module 278, which may process authentication data request 304 to detect a presence of contract identifier 272, e.g., that uniquely identifies the distributed smart contract within the permissioned block-chain ledger. In some aspects, and in response to the detection of contract identifier 272, initiation module 278 may perform operations that invoke the distributed smart contract and thus, the execution of the code elements that establish the distributed smart contract, e.g., as maintained in management module 148A of smart contract ledger blocks 148.

In some instances, one or more processors of node system 132 may access the permissioned block-chain ledger (e.g., as maintained within ledger data 144 of data repository 142) and execute the code elements maintained within management module 148A. In other instances, and consistent with the disclosed embodiments, node system 132 may execute an instance of a distributed virtual machine, which accesses the permissioned block-chain ledger and executes the code elements maintained within management module 148A (e.g., based on output data generated by initiation module 278).

Upon invocation of the distributed smart contract, initiation module 278 may extract payload data 308, which includes public cryptographic key 264, and digital signature 306 from authentication data request 304, and provide payload data 308 and digital signature 306 as an input to management module 148A, which includes the executable code elements that establish the distributed smart contract. In some examples, verification module 280 of management module 148A may receive payload 308 and digital signature 306 and perform operations that extract public cryptographic key 264 from payload 308, and that verify digital signature 306 based on public cryptographic key 264.

In one instance, if verification module 280 were unable to verify digital signature 306, the distributed smart contract may decline to provision elements of biometric authentication data associated with public cryptographic key 264 to client device 102 in response to authentication data request 304. Management module 148A may perform operations that output data indicative of the unsuccessful verification, which node system 132 may relay back to client device 102.

Alternatively, if verification module 280 were to successfully verify digital signature 306, executed management module 148A may perform additional operations that determine whether user 101 is an enrolled participant in the exemplary decentralized biometric authentication processes described herein. For example, verification module 280 may provide public cryptographic key 264 as an input to a provisioning module 310, which may access one or more ledger blocks of the permissioned blockchain ledger that maintain biometric authentication data on behalf of one or more enrolled users (e.g., within biometric authentication blocks 146 of ledger data 144), and established whether the access ledger blocks include elements biometric authentication data associated with, or linked to, public cryptographic key 264 of user 101.

For example, if provisioning module 310 were unable identify any elements of biometric authentication data associated with, or linked to, public cryptographic key 264, the distributed smart contract may establish that user 101 is not an enrolled participant in the exemplary decentralized biometric authentication processes described herein. Management module 148A may perform operations that output data indicative of user 101's enrollment status, which node system 132 may relay back to client device 102. In some instances, client device 102 may perform operations that present information indicative of the enrollment status, e.g., within a graphical user interface displayed on display unit 1196, and the presented information may prompt user 101 to provide input to client device 102 that initiates any of the exemplary enrollment processes described herein.

In other examples, if provisioning module 310 were to identify one or more elements of biometric authentication data associated with, or linked to, public cryptographic key 264, the distributed smart contract may establish that user 101 is an enrolled participant in the exemplary decentralized biometric authentication processes described herein, and provisioning module 310 may extract the one or more identified elements of biometric authentication, e.g., reference biometric authentication data 286, from biometric authentication blocks 146. For instance, and as described herein, reference biometric authentication data 286 may include, among other things, coordinate data 212 (e.g., the maps elements of biometric data 202 to corresponding spatial coordinates along a surface of biometric sensor 108) and one or more hash values 260 (e.g., one or more of hash values 260A, 260B, or 260C that represent respective ones of coordinate data 212, range value data 222, and transformed range value data 258).

Provisioning module 310 may package all or a portion of reference biometric authentication data 286 into corresponding portions of response data 311, which provisioning module 310 may provide as an input to a routing module 312 of node system 132. Routing module 312 may, in some instances, receive response data 311 and may perform operations that cause node system 132 (e.g., and additionally, or alternatively, others of node systems 130) to transmit response data 311 across network 120 to client device 102, e.g., through a secure, programmatic channel of communication.

Figure 3B:
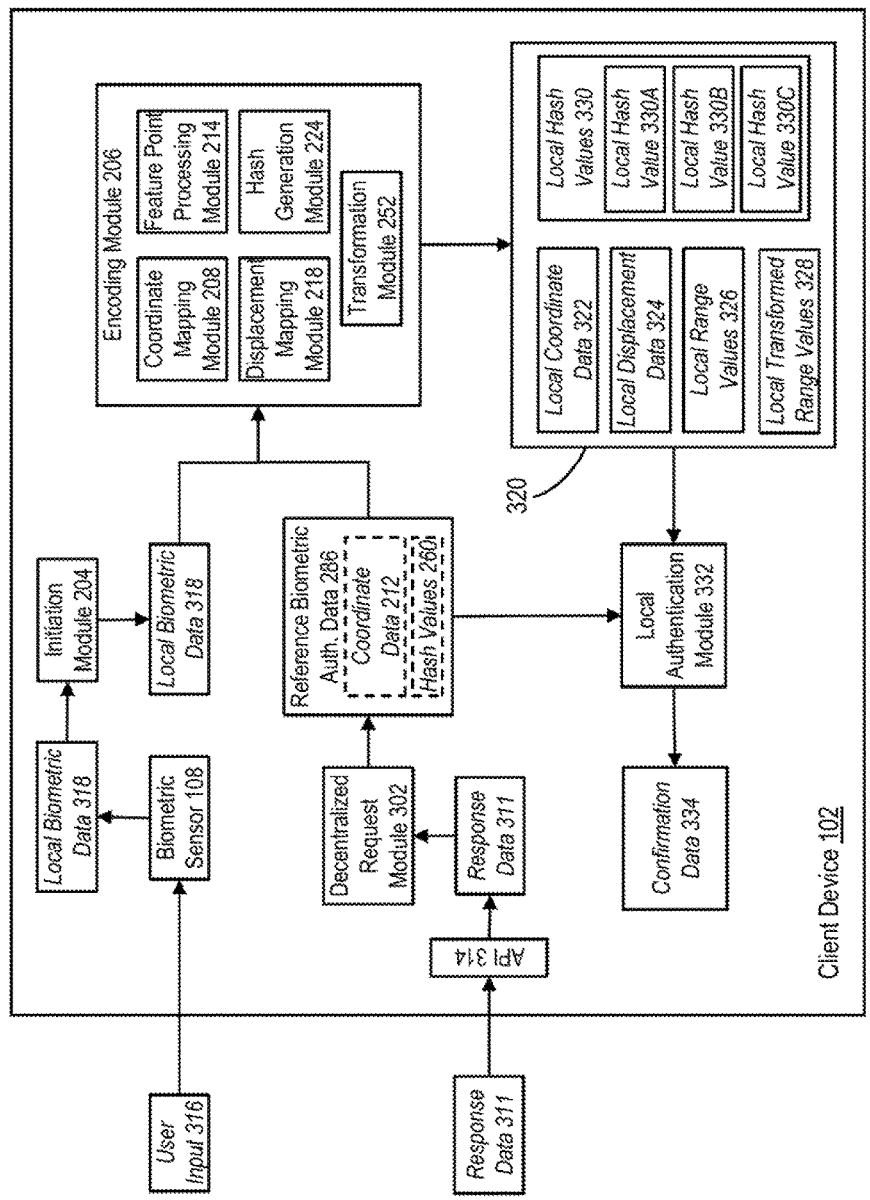

Referring to FIG. 3B, a programmatic interface established and maintained by decentralized authentication engine 106, e.g., application programming interface (API) 314, may receive response data 311, and may route response data 311 to decentralized request module 302, which may perform operations that parse response data 311 and store all of a portion of reference biometric authentication data 286 within one or more tangible, non-transitory memories. For example, reference biometric authentication data 286 may include, among other things, coordinate data 212 (e.g., the maps elements of biometric data 202 to corresponding spatial coordinates along a surface of biometric sensor 108) and one or more hash values 260 (e.g., one or more of hash values 260A, 260B, or 260C that represent respective ones of coordinate data 212, range value data 222, and transformed range value data 258, as described herein).

In further instances, decentralized authentication engine 106 may cause client device 102 to present, on display unit 119A, a graphical user interface (GUI) that prompts user 101 to initiate the enrollment process and provide biometric input to client device 102, e.g., via biometric sensor 108. For example, and as described herein, biometric sensor 108 may include an optical or capacitive fingerprint scanner configured to capture one or more fingerprints of user 101, e.g., a thumbprint, during corresponding sampling intervals. In response to the presented GUI, user 101 may engage biometric sensor 108, e.g., by disposing a portion of a thumb onto a surface of the optical or capacitive fingerprint scanner, and biometric sensor 108 may detect user input, e.g., user input 316 of FIG. 3B, that initiates a capture of raw biometric data that identifies and characterizes user 101.

As illustrated in FIG. 3B, biometric sensor 108 may detect user input 316, e.g., the disposition of the thumb onto the surface of the optical or capacitive fingerprint scanner, and may perform operations that capture local biometric data 318 at discrete times during a corresponding sampling interval. For example, local biometric data 318 may include sensor data that specifies one or more thumbprints of user 101 captured during the corresponding sampling interval (e.g., information characterizing electrical charges obtained from an array of capacitors that collectively establish the capacitive fingerprint scanner, etc.), along with temporal information that specifies the time at which biometric sensor 108 captured each of the thumbprints.

Biometric sensor 108 may also provide local biometric data 318 as an input to initiation module 204 of decentralized authentication engine 106 (e.g., as executed by client device 102 using any of the exemplary processes described herein), and initiation module 204 may perform operations that store all or a portion of local biometric data 318 within one or more tangible, non-transitory memories, e.g., within biometric data 114. Further, and as described herein, initiation module 204 may also provide local biometric data 318 as an input to encoding module 206 of executed decentralized authentication engine 106.

In some instances, encoding module 206 may receive local biometric data 318, and one or more components of encoding module 206, e.g., coordinate mapping module 208, may perform any of the exemplary processes described herein to map portions of local biometric data 318 that correspond to each of the sampled thumbprints to a physical coordinate space associated with biometric sensor 108 (e.g., a spatial coordinate system, such as Cartesian coordinates having an origin on the surface of biometric sensor 108, or a polar coordinate system having an origin at a center point on the surface of biometric sensor 108, etc.). By mapping the sampled thumbprints to the physical coordinate space, encoding module 206 may generate coordinate data that correlates each elements of raw biometric data 202 to a corresponding spatial position on the surface of biometric sensor 108, e.g., local coordinate data 322, as a portion of local biometric authentication data 320.

Further, and based on corresponding portions of local coordinate data 322, encoding module 206 may perform any of the exemplary processes described herein to identify the spatial coordinates specifying one or more feature points disposed within each of the captured thumbprints (e.g., within local biometric data 318), and to compute, for each feature point within the captured thumbprint samples, a range of displacements between that feature point and each of the other feature points within the locally captured thumbprint samples (e.g., by "overlaying" all or a portion of the captured thumbprint samples within the physical coordinate space described herein). In some instances, encoding module 206 may access portions of locally stored reference biometric authentication data 286 (e.g., biometric coordinate data 212), and perform operations that align portions of local coordinate data 322 for consistency with, or conformance to, corresponding portions of biometric coordinate data 212.

For example, encoding module 206 may perform operations that align a detected center point of a captured thumbprint sample within local coordinate data 322 with the spatial coordinates of the center point of one or more reference thumbprint samples within coordinate data 212 (e.g., as maintained within reference biometric authentication data 286). In some instances, one or more components of encoding module 206, e.g., feature point processing module 214, may perform any of the exemplary processes described herein to identify the features points within each of the locally captured thumbprint samples, and to compute the range of displacements that characterize each pair of the feature points, based on the aligned portions of local coordinate data 322. Further, and as described herein, feature point processing module 214 may perform operations that generate local displacement data 324, which identifies and characterizes each of the displacement ranges, as a portion of local biometric authentication data 320.

Encoding module 206 may also perform any of the exemplary processes described herein that that apply one or more mapping functions (e.g., a corresponding key map) to the each of the displacement ranges within local displacement data 324 to generate a value (e.g., a range value) that characterizes the displacement range between each pair of feature points within the captured thumbprint samples. For example, and as described herein, one or more component modules of encoding module 206 (e.g., displacement mapping module 218 of FIG. 2A) may extract, from one or more tangible, non-transitory memories (e.g., from engine data 118), key map data 220 that identifies and characterizes the one or more range mapping functions, may apply the one or more range mapping functions to the each of the displacement ranges (e.g., as specified within local displacement data 324 to generate a range value that characterizes the displacement range between each pair of feature points within the locally captured thumbprint samples. Encoding module 206 may perform any of the exemplary processes described herein package the generated range values, and in some instances, the spatial positions of the feature points associated with corresponding ones of the displacement range values, into local range value data 326, e.g., as a portion of local biometric authentication data 320.

Further, and described herein, encoding module 206 may also apply one or more statistical algorithms or transformations to portions of local coordinate data 322 generate transformed biometric coordinate data. For example, one or more components of encoding module 206, e.g., transformation module 252, may apply a principal component analysis (PCA) to portions of local coordinate data 322 (e.g., which also specifies the spatial coordinates of the feature points within the locally captured thumbprint samples), to generate transformed coordinate data that specifies transformed spatial coordinates of the feature points within a transformed coordinate space. In some instances, encoding engine 206 may perform any of the exemplary processes described herein to compute, for each of the feature points, a range of transformed displacements between that feature point and each of the other feature points within the captured thumbprint samples (e.g., by "overlaying" all or a portion of the captured thumbprint samples within the transformed coordinate space described herein, and to map each of the displacement ranges to a corresponding transformed displacement value (e.g., based on the corresponding key map described herein).

For example, one or more components of encoding module 206, e.g., feature point processing module 214, may generate transformed local range data that identifies and characterizes, for each feature point within the locally captured thumbprint samples, a range of displacements in the transformed coordinate space between that feature point and each of the other feature points within the captured thumbprint samples. One or more additional components of encoding module 206, e.g., displacement mapping module 218 of FIG. 2A, may receive the transformed local range data, which identifies and characterizes the local displacement ranges associated with each of the feature points within the transformed coordinate space, and may perform any of the exemplary processes described herein to apply the one or more range mapping functions (e.g., as specified within key map data 220) to portions of the transformed local range data.

In some instances, displacement mapping module 218 of encoding module 206 may perform any of the exemplary processes described herein to generate a corresponding transformed local range value that characterizes the displacement range, in the transformed coordinate space, between each pair of feature points within the locally captured thumbprint samples. Further, and as described herein, displacement mapping module 218 may package the transformed local range values, and in some instances, the transformed coordinates positions of the feature points, into local transformed range value data 328, e.g., as a portion of local biometric authentication data 320.

Further, in some instances, encoding module 206 may perform additional operations that generate a cryptogram or hash value representative of the sample coordinate data for the captured thumbprints (e.g., which also specifies the spatial coordinates of the feature points within the captured thumbprint samples), the physical displacement values (e.g., based the computed displacements between the pairs of feature points in the physical coordinate space) and the transformed displacement values (e.g., based on the transformed displacements between the pairs of feature points). For example, one or more components of encoding engine 206, e.g., hash generation module 224, may access portions of local biometric authentication data 320 that include, but are not limited to, local coordinate data 322, local range value data 326, and local transformed range value data 328. As described herein, hash generation module 224 may access engine data 118 (e.g., as maintained within one or more tangible, non-transitory memories), and extract hash function data that specifies the one or more hash functions, such as, but not limited to, an SHA-256 hash function, an SHA-384 hash function, or an SHA-512 hash function. In some instances, the one or more hash functions may be consistent with, and identical to, the one or more corresponding hash functions applied by hash generation module when implementing the exemplary enrollment processes described herein.

In some examples, hash generation module 224 may apply one or more hash functions to all or a portion of local coordinate data 322, local range value data 326, and local transformed range value data 328, and generate corresponding local hash values 330 that represent local coordinate data 322 (e.g., local hash value 330A), local range value data 326 (e.g., hash value 330B), and local transformed range value data 328 (e.g., local hash value 330C). In other examples, not illustrated in FIG. 3B, hash generation module 224 may generate a single hash value that collectively represents local coordinate data 322, local range value data 326, and local transformed range value data 328, and additionally, or alternatively, multiple hash values that, respectively, represent subsets of local coordinate data 322, local range value data 326, and local transformed range value data 328.

In some examples, encoding module 206 may perform operations that store local biometric authentication data 320 within one or more tangible, non-transitory memories, and that provide all or a portion of local biometric authentication data 320 as an input to a local authentication module 332 of decentralized authentication engine 106. As described herein, local biometric authentication data 320 may include, among other things, one or more local hash values 330, which represent respective ones of local coordinate data 322 (e.g., local hash value 330A), local range value data 326 (e.g., hash value 330B), and local transformed range value data 328 (e.g., local hash value 330C).

Further, and in some examples, local authentication module 332 may also access portions of reference biometric authentication data 286 (e.g., as maintained within one or more tangible, non-transitory memories), which client device 102 may obtain from one or more ledger blocks of the permissions blockchain ledger (e.g., from biometric authentication blocks 146) using any of the exemplary processes described herein. For instances, as described herein, reference biometric authentication data 286 may include one or more reference hash values, such as, but not limited to, hash values 260 that represent respective ones of coordinate data 212 (e.g., hash value 260A), range value data 222 (e.g., hash value 260B), and transformed range value data 258 (e.g., hash value 260C).

In some instances, local authentication module 332 may perform operations that authenticate an identity of user 101 based on a comparison between one or more of the reference hash values (e.g., hash values 260A, 260B, or 260C) against corresponding ones of local hash values 330 (e.g., corresponding ones of local hash value 330A, local hash value 330B, or local hash value 330B). For example, and without limitation, local authentication module 332 may perform operations that determine whether to authenticate the identity of user 101 based on an established consistency, or inconsistency, between reference hash value 260A and local hash value 330A, between reference hash value 260B and local hash value 330B, and/or between hash value 260C and local hash value 330C.

If local authentication module 332 were to detect an inconsistency between any of the reference hash values and a corresponding one of the local hash values, decentralized authentication engine 106 may decline to authenticate the identity of user 101, and may generate confirmation data 334 indicative of the unsuccessful authentication of user 101. In some aspects, client device 102 may perform additional operations (not illustrated in FIG. 3B) that process confirmation data 334 and present information indicative of the unsuccessful authentication of user 101's identified within a corresponding graphical user interface, e.g., as displayed on display unit 119A. For instance, the presented information may prompt user 101 to enter one or more additional, or alternate, authentication credentials, or alternatively, to provide additional input to client device 102 that initiates any of the exemplary enrollment processes described herein.

Alternatively, if local authentication module 332 were to establish consistency between each of the reference hash values and the corresponding one of the local hash values, decentralized authentication engine 106 may authenticate the identity of user 101, and may generate confirmation data 334 indicative of the successful authentication of user 101. In some examples, and based on confirmation data 334, client device 102 may perform operations consistent with the successful authentication of user 101's identity, such as, but not limited to, unlocking client device 102 or enabling client device 102 to access one or more functionalities of client device 102. In other examples, and consistent with the disclosed exemplary embodiments, decentralized authentication engine 106 may provide confirmation data 334 to one or more additional application programs executed by client device 102, e.g., through a corresponding programmatic interface or an API, and the one or more additional application programs may perform operations consistent with the successful authentication of user 101's identity. For instance, the one or more additional application programs may include, but are not limited to, mobile applications associated with a financial institution or context provider, which may enable user 101 to access one or more secure portions of corresponding digital portal in response to the successful authentication of user 101's identity.

Figure 4:
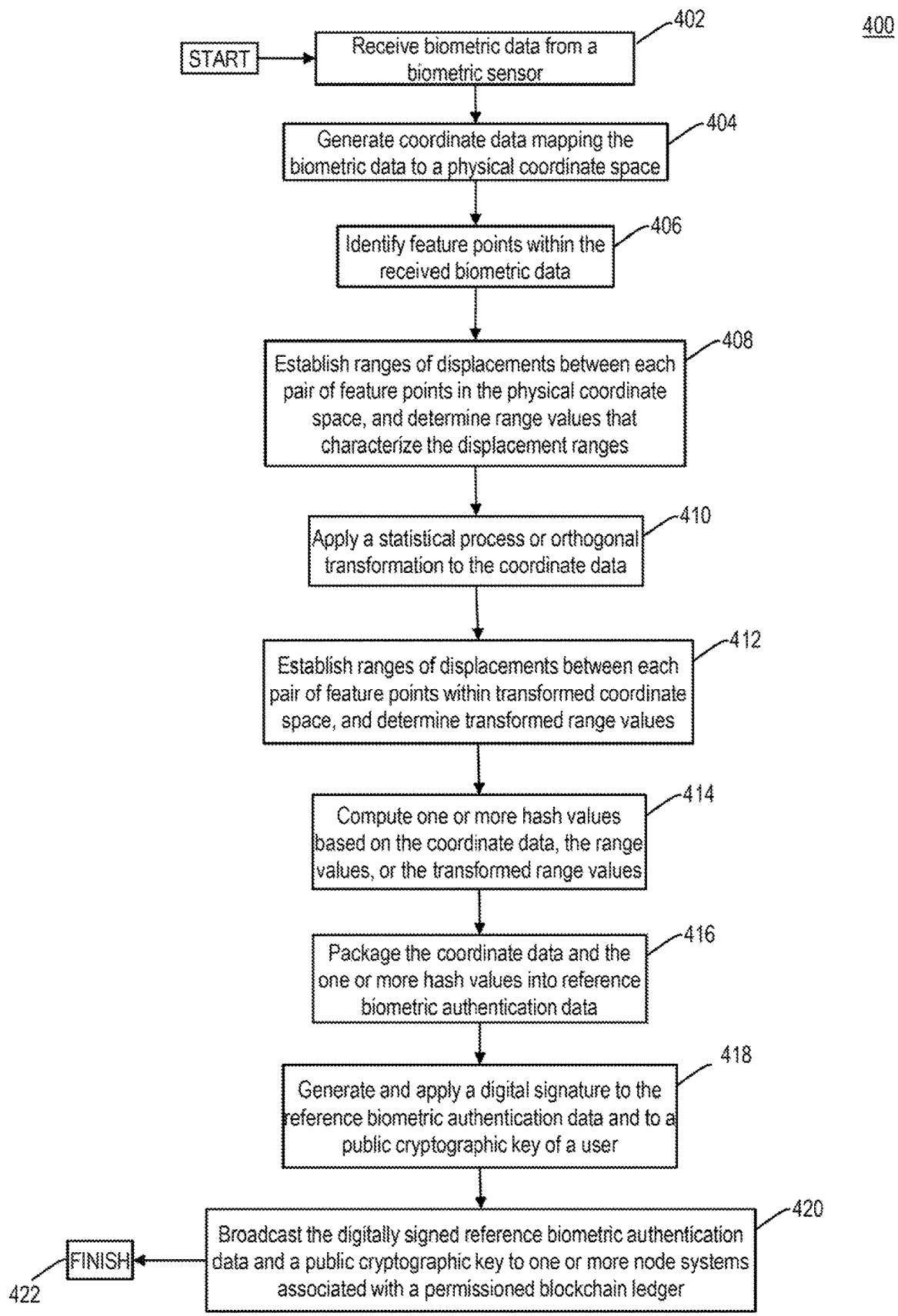
FIGS. 4 and 5 are flowcharts of exemplary processes for authenticating identity based on biometric authentication data maintained within a permissioned distributed ledger, consistent with the disclosed embodiments.

FIG. 4 is a flowchart of an exemplary process 400 for authenticating user identity based on biometric authentication data maintained within a permissioned distributed ledger. In some instances, client device 102 or client device 122 may perform all or a portion of the steps of exemplary process 400, which include, but are not limited to, receiving biometric data captured by a biometric sensor unit, generating reference biometric authentication data that characterizes one or more elements of the received biometric data, and broadcasting an enrollment request that includes the reference biometric authentication data and a public cryptographic key to one or more node systems associated with the permissioned distributed ledger. As described herein, the one or more node systems may perform consensus-based operations that validate the enrollment request and generate one or more new ledger blocks of the permissioned distributed ledger that associated the reference biometric authentication data with the public cryptographic key.

Referring to FIG. 4, client device 102 (or client device 122) may receive biometric data captured by one or more biometric sensors during a corresponding sampling interval (e.g., in step 402). In some instances, in step 402, client device 102 (or client device 122) may perform operations that store all or a portion of the received biometric data, along with corresponding temporal data that specific a time or date at which the one or more biometric sensors captured the biometric data, within one or more tangible, non-transitory memories, e.g., within biometric data 114 of FIG. 1.

By way of example, the one or more biometric sensors may include an optical or capacitive fingerprint scanner, which may detect a disposition of a user finger or thumb on a scanner surface, and may capture one or more samples of a corresponding fingerprint or thumbprint during the corresponding sampling interval. In other examples, the one or more biometric sensors may include a retinal scanner configured to obtain data characterizing a retina of a user's eye, or an iris scanner configured to obtain data characterizing an iris of the user's eye. For instance, the retinal and/or iris scanner may include, but is not limited to, a digital camera coupled to one or more optical components that irradiate the user's eye with radiation having a particular wavelength of range of wavelengths (e.g., low-energy near-infrared radiation to scan the user's iris, or low-energy infrared radiation to scan the user's retina). Further, in some examples, the one or more biometric sensors may include one or more motion sensors or accelerometers that, collectively, capture portions of the postural data characterizing the posture or gait of the user during the corresponding sampling intervals.

Referring back to FIG. 4, client device 102 (or client device 122) may perform any of the exemplary processes described herein to generate coordinate data that maps the received biometric data to a physical coordinate space associated with the one or more biometric sensors (e.g., in step 404). Client device 102 (or client device 122) may also perform any of the exemplary processes described herein to identify spatial coordinates of one or more feature points disposed within the received biometric data (e.g., in step 406).

Further, in step 408, client device 102 (or client device 122) may perform any of the exemplary processes described herein to: compute, for each feature point within the received biometric data, a range of displacements between that feature point and each of the other feature points within the received biometric data; and to determine a range value that characterizes the displacement range between each pair of feature points within the received biometric data. For example, client device 102 (or client device 122) may compute the range of displacements that characterize the pairs of feature points by "overlaying" discrete samples of the received biometric data within the physical coordinate space described herein, and may determine the range value for each of the pairs of feature points based on an application of one or more mapping functions (e.g., a corresponding key map) to corresponding ones of the displacement ranges. In some instances, client device 102 (or client device 122) may package the displacement range value determined for each of the pairs of feature points, and additionally, or alternatively, data characterizing the ranges of displacements for these pairs of feature points, within corresponding portions of range data (e.g., also in step 408).

Client device 102 (or client device 122) may also apply one or more statistical processes or orthogonal transformations to portions of the generated coordinate data to generate transformed coordinate data (e.g., in step 410). For example, client device 102 (or client device 122) may apply a principal component analysis (PCA) to the coordinate data (e.g., which also specifies the spatial coordinates of the feature points within the captured thumbprint samples), to generate transformed coordinate data that specifies transformed spatial coordinates of the feature points within a transformed coordinate space.

In further examples, and based on the transformed coordinate data, client device 102 (or client device 122) may perform any of the exemplary processes described herein to compute a range of displacements that characterize each of pair of feature points within the transformed coordinate space (e.g., a range of "transformed" displacements), and to map each of the transformed displacement ranges to a corresponding transformed range value (e.g., in step 412). In some instances, client device 102 (or client device 122) may package the transformed range value determined for each of the pairs of feature points, and additionally, or alternatively, data characterizing the ranges of transformed displacements for these pairs of feature points, within corresponding portions of transformed range data (e.g., also in step 412).

Client device 102 (or client device 122) may perform any of the exemplary processes described herein to compute one or more hash values representative of all, or corresponding subsets, of the generated coordinate data, the generated range data, and/or the generated transformed range data (e.g., in step 414). Further, in some examples, client device 102 (or client device 122) may package the generated coordinate data, and the one or more hash values, into corresponding portions of reference biometric authentication data (e.g., in step 416), and client device 102 (or client device 122) may perform any of the exemplary process described herein to generate and apply a digital signature to the reference biometric authentication data and to a public cryptographic key of the user (e.g., in step 418).

Client device 102 (or client device 122) may also perform operations that broadcast the digitally signed reference biometric authentication data and public cryptographic key to one or more node systems associated with the permissioned distributed ledger described herein (e.g., in step 420). In some examples, and as described herein, the permissioned distributed ledger may maintain, within one or more ledger blocks, elements of executable code that collectively establish a distributed smart contract. Upon receipt of the digitally signed reference biometric authentication data and public cryptographic key from client device 102 or 122, the one or more node systems may access and execute the elements of executable code and perform operations that validate the applied digital signature, e.g., based on the public cryptographic key. In response to a successful validation, the one or more node systems may perform consensus-based operations that generate a new ledger block of the permissioned distributed ledger that includes the reference biometric authentication data and associates the public cryptographic key with the reference biometric authentication data. Exemplary process 400 is then complete in step 422.

Figure 5:
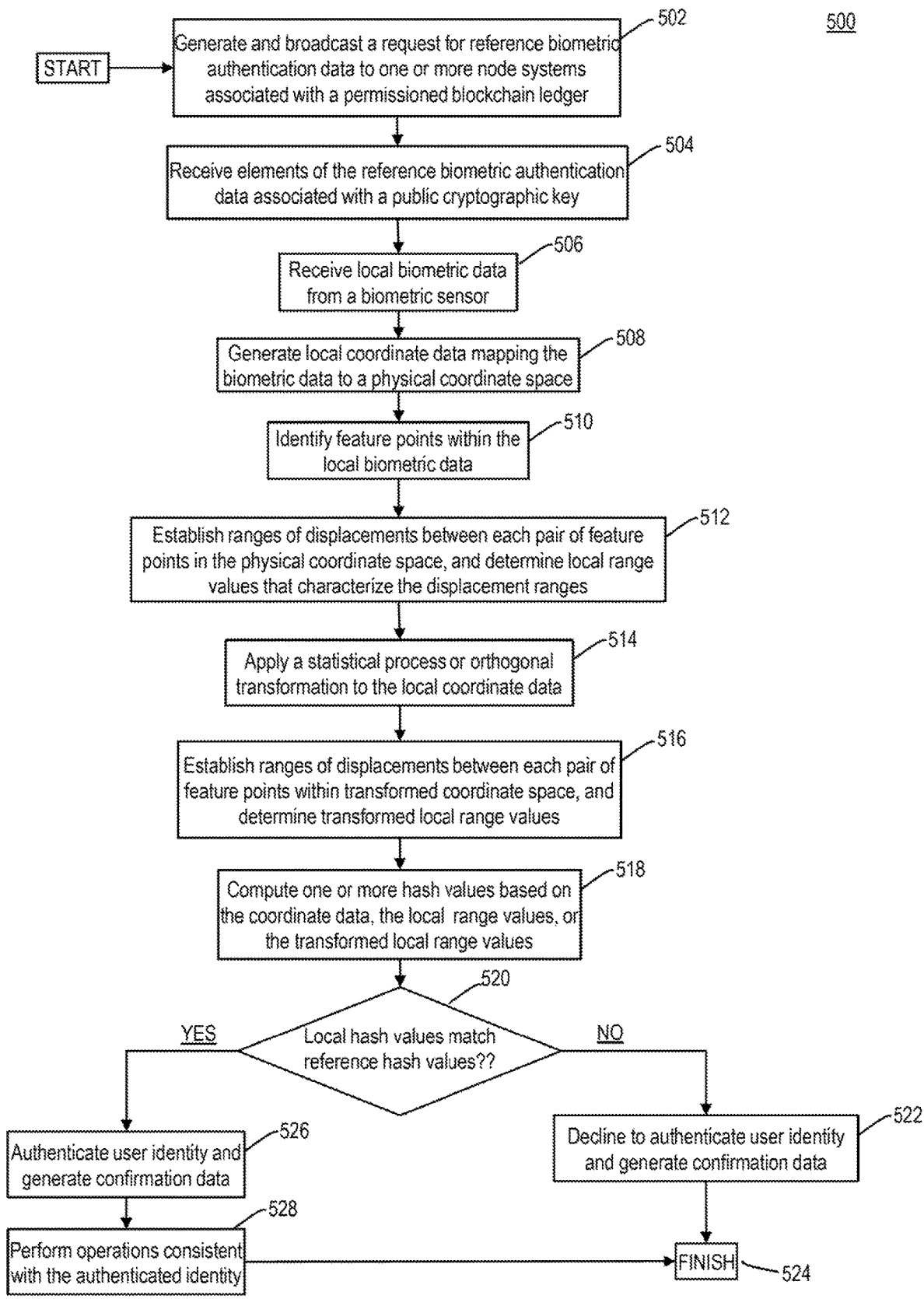

FIG. 5 is a flowchart of an exemplary process 500 for authenticating user identity based on biometric authentication data maintained within a permissioned distributed ledger. In some instances, client device 102 or client device 122 may perform all or a portion of the steps of exemplary process 400, which include, but are not limited to, receiving biometric data captured by a biometric sensor unit, generating local biometric authentication data that characterizes one or more elements of the received biometric data, requesting and receiving, from one or more node systems, reference biometric authentication data maintained within a permissioned distributed ledger, and authenticating an identifier of a user based on a comparison of portions of the local and reference biometric authentication data.

Referring to FIG. 5, client device 102 (or client device 122) may perform any of the exemplary processes described herein to generate and broadcast a request for reference biometric authentication data from one or more node systems associated with a permissioned distributed ledger (e.g., in step 502). In some examples, the request may include a public cryptographic key of a user of client devices 102 or 122, and the public cryptographic key may be linked to, and may identify with elements of the reference biometric data associated with the user within the ledger blocks of the permissioned blockchain ledger. Further, and as described herein, client device 102 (or client device 122) may perform any of the exemplary processes described herein to generate and apply a digital signature to all or a portion of the request, e.g., based on a private cryptographic key of the user (e.g., also in step 502).

In some examples, as described herein, the one or more nodes may receive the request, and may perform any of the exemplary processes described herein to validate the applied digital signature (e.g., based on the public cryptographic key) and verify an integrity of the request. In response to the validated digital signature and the verified integrity of the request, the one or more node systems may execute code elements that establish a distributed smart contract (e.g., as maintained within the permissioned distributed ledger), and perform consensus-based operations that access the ledger blocks of the permissioned distributed ledger, identify and extract elements of the reference biometric authentication data associated with the public cryptographic key, and transmit the extracted elements of the reference biometric authentication data to client device 102 (or client device 122) across a secure, programmatic channel of communications.

Referring back to FIG. 5, client device 102 (or client device 122) may receive the elements of reference biometric authentication data, which identify and characterize the user and are associated with the public cryptographic key of the user (e.g., in step 504). As described herein, the elements of reference biometric authentication data may include, but are not limited to, reference coordinate data (e.g., the maps elements of reference biometric data to corresponding spatial coordinates along a surface of a corresponding biometric sensor unit) and one or more reference hash values (e.g., that represent all, or subsets, or the reference coordinate data, one or more reference range values, and one or more transformed reference range values). In some instances, client device 102 (or client device 122) may perform operations that store the elements of reference biometric authentication data within one or more tangible, non-transitory memories (e.g., also in step 504).

Further, in some examples, client device 102 (or client device 122) may receive local biometric data captured by one or more biometric sensors during a corresponding sampling interval, and as described herein, may store the local biometric data within one or more tangible, non-transitory memories (e.g., in step 506). Client device 102 (or client device 122) may perform any of the exemplary processes described herein to: generate local coordinate data that maps the local biometric data to a physical coordinate space associated with the one or more biometric sensors (e.g., in step 508); and identify spatial coordinates of one or more feature points disposed within the received biometric data (e.g., in step 510).

Further, in step 512, client device 102 (or client device 122) may perform any of the exemplary processes described herein to: compute, for each feature point within the local biometric data, a range of displacements between that feature point and each of the other feature points within the local biometric data; and to determine a local range value that characterizes the displacement range between each pair of feature points within the received biometric data. In some instances, client device 102 (or client device 122) may package the local range values determined for each of the pairs of feature points, and additionally, or alternatively, data characterizing the ranges of displacements for these pairs of feature points, within corresponding portions of local range data (e.g., also in step 512).

Client device 102 (or client device 122) may also apply one or more statistical processes or orthogonal transformations (e.g., a principal component analysis) to portions of the local coordinate data to generate transformed local coordinate data (e.g., in step 514). In further examples, and based on the transformed coordinate data, client device 102 (or client device 122) may perform any of the exemplary processes described herein to compute a range of displacements that characterize each of pair of feature points within the transformed coordinate space (e.g., a range of "transformed" displacements), and to map each of the transformed displacement ranges to a corresponding transformed local range value (e.g., in step 516). In some instances, client device 102 (or client device 122) may package the transformed local range value determined for each of the pairs of feature points, and additionally, or alternatively, data characterizing the ranges of transformed displacements for these pairs of feature points, within corresponding portions of transformed local range data (e.g., also in step 516).

Client device 102 (or client device 122) may perform any of the exemplary processes described herein to compute one or more local hash values representative of all, or corresponding subsets, of the generated local coordinate data, the generated local range data, and/or the generated transformed local range data (e.g., in step 518). Further, client device 102 (or client device 102) may perform any of the exemplary processes described herein to determine whether each of one or more local hash values is consistent with, and matches, a corresponding one of the references hash values (e.g., in step 520)

If client device 102 (or client device 122) were to detect an inconsistency between any of the reference hash values and a corresponding one of the local hash values (e.g., step 520; NO), client device 102 (or client device 122) may decline to authenticate the identity of the user and may generate confirmation data indicative of the unsuccessful authentication (e.g., in step 522). In some instances (not illustrated in FIG. 5), client device 102 (or client device 122) may perform additional operations that process the confirmation data and present information indicative of the unsuccessful authentication of the user 101 identity within a corresponding graphical user interface, e.g., as displayed on display unit 119A. For instance, the presented information may prompt the user to enter one or more additional, or alternate, authentication credentials, or alternatively, to provide additional input to client device 102 (or client device 122) that initiates any of the exemplary enrollment processes described herein. Exemplary process 500 is then complete in step 524.

Alternatively, if client device 102 (or client device 122) were to establish consistency between each of the reference hash values and the corresponding one of the local hash values (e.g., step 520; YES), client device 102 (or client device 122) may authenticate the identity of the user and may generate confirmation data indicative of the successful authentication of the user (e.g., in step 526). In some examples, and based on the confirmation data, client device 102 (or client device 122) may perform operations consistent with the successful authentication of the user's identity, such as, but not limited to, unlocking client devices 102 or 122, or enabling the user's access to one or more functionalities of client devices 102 or 122 (e.g., in step 528). In other examples, client device 102 (or client device 122) may perform operations that route the confirmation data to one or more additional executed application programs, e.g., through a corresponding programmatic interface or an API, and the one or more additional application programs may perform operations consistent with the successful authentication of the user's identity, as described herein (e.g., also in step 528). Exemplary process 500 is then complete in step 524.

III. Exemplary Hardware and Software Implementations

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification, including distributed authentication engine 106, notary module 148A, initiation module 204, encoding module 206, coordinate mapping module 208, feature point processing module 214, displacement mapping module 218, hash generation module 224, transformation module 252, enrollment module 262, routing module 274, API 276, initiation module 278, verification module 280, local enrollment module 284, blockchain generation module 288, distributed consensus module 292, decentralized request module 302, data provisioning module 310, routing module 312, API 314, and local authentication module 332, can be implemented as one or more computer programs, i.e., one or more modules of computer program instructions encoded on a tangible non-transitory program carrier for execution by, or to control the operation of, a data processing apparatus (or a computing system). Additionally, or alternatively, the program instructions can be encoded on an artificially-generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including by way of example a programmable processor, a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) or an assisted Global Positioning System (AGPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a client computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. A device, comprising:
   a sensor unit;
   a communications unit;
   a storage unit storing instructions; and
   at least one hardware processor coupled to the sensor unit, the communications unit, and the storage unit, the at least one hardware processor being configured to execute the instructions to:
   transmit, via the communications unit, a public cryptographic key to a computing system, the computing system being configured to obtain first biometric data from an element of distributed ledger data associated with the public cryptographic key;
   receive the first biometric data from the computing system via the communications unit; and
   authenticate an identity associated with the device based on the first biometric data and on second biometric data captured by the sensor unit.

2. The device of claim 1, wherein:
   the public cryptographic key is associated with the device; and
   the computing system is further configured to execute additional instructions included within an additional element of distributed ledger data, the additional executed instructions causing the computing system to identify and load the first biometric data from the element of the distributed ledger data.

3. The device of claim 1, wherein:
   the first biometric data comprises a first hash value; and
   the at least one hardware processor is further configured to execute the instructions to:
   compute a second hash value based on the second biometric data; and
   authenticate the identity when the first hash value corresponds to the second hash value.

4. The device of claim 3, wherein the at least one hardware processor is further configured to execute the instructions to:
   perform operations that map elements of the second biometric data to corresponding spatial coordinates, the spatial coordinates being associated with the sensor unit; and
   compute the second hash value based on the elements of the second biometric data and the corresponding spatial coordinates.

5. The device of claim 1, wherein:
   the second biometric data comprises a plurality of biometric data samples, the biometric data samples being captured by the sensor unit during a corresponding sampling interval; and
   the at least one hardware processor is further configured to execute the instructions to:
   identify feature points within each of the biometric data samples;
   based on the second biometric data, generate first coordinate data that maps the identified feature points to corresponding first coordinates, the first coordinates being associated with the sensor unit; and
   compute first displacements between the first coordinates of corresponding pairs of the identified feature points within the biometric data samples.

6. The device of claim 5, wherein:
   the first biometric data comprises a first hash value; and
   the at least one hardware processor is further configured to execute the instructions to:
   based on the computed first displacements, establish a displacement range for the each of the identified pairs of feature points;
   determine a range value that characterizes the displacement range for each of the identified pairs of feature points;
   compute a second hash value based on the range values; and
   authenticate the identity when the first hash value corresponds to the second hash value.

7. The device of claim 5, wherein:
   the first biometric data comprises a first hash value; and
   the at least one hardware processor is further configured to:
   generate second coordinate data based on an application of an orthogonal transformation to portions of the first coordinate data, the second coordinate data mapping the identified feature points to corresponding second coordinates associated with the orthogonal transformation;
   compute second displacements between the second coordinates of corresponding pairs of the identified feature points within the biometric data samples;
   based on the computed second displacements, establish a displacement range for the each of the identified pairs of feature points;
   determine a range value that characterizes the displacement range for each of the identified pairs of feature points; and
   compute a second hash value based on the determined range values; and
   authenticate the identity when the first hash value corresponds to the second hash value.

8. The device of claim 5, wherein:
   the sensor unit comprises a fingerprint scanner having a corresponding surface;
   the biometric data samples identify fingerprints captured by the fingerprint scanner;
   the first coordinates correspond to spatial coordinates; and
   the first coordinate data maps the identified feature points to corresponding spatial positions along the surface of the fingerprint scanner.

9. The device of claim 1, wherein:
   the sensor unit comprises at least one of a fingerprint scanner, an iris scanner, a retinal scanner, a motion sensor, an accelerometer, or a digital camera; and
   the first biometric data comprises at least one of a fingerprint sample, an iris scan, a retinal, or postural data characterizing a posture or gait of a user.

10. The device of claim 1, wherein:
    the second biometric data is associated with a user; and
    the first biometric data comprises reference biometric data associated with the user, the reference biometric data being maintained within the element of the distributed ledger data.

11. The device of claim 1, wherein the at least one hardware processor is further configured to execute the instructions to:
   receive third biometric data captured by the sensor unit; and
   transmit the public cryptographic key and at least a portion of the third biometric data to the computing system via the communications unit, the computing system being further configured to generate an additional element of the distributed ledger data that associates the portions of the third biometric data with the public cryptographic key.

12. A computer-implemented method, comprising:
   by at least one hardware processor, transmitting a public cryptographic key to a computing system, the computing system being configured to obtain first biometric data from an element of distributed ledger data associated with the public cryptographic key;
   receiving, by the at least one hardware processor, the first biometric data from the computing system; and
   authenticating, by the at least one hardware processor, an identity associated with the device based on the first biometric data and on second biometric data captured by a sensor unit.

13. The computer-implemented method of claim 12, wherein the computing system is further configured to execute additional instructions included within an additional element of distributed ledger data, the additional executed instructions causing the computing system to identify and load the first biometric data from the element of the distributed ledger data.

14. The computer-implemented method of claim 12, wherein:
   the first biometric data comprises a first hash value;
   the computer-implemented method further comprises computing, by the at least one hardware processor, a second hash value based on the second biometric data; and
   the authenticating comprises authenticating the identity of the device when the first hash value corresponds to the second hash value.

15. The computer-implemented method of claim 14, further comprising:
   performing, by the at least one hardware processor, operations that map elements of the second biometric data to corresponding spatial coordinates, the spatial coordinates being associated with the sensor unit; and
   computing, by the at least one hardware processor, the second hash value based on the elements of the first biometric data and the corresponding spatial coordinates.

16. The computer-implemented method of claim 14, wherein:
   the sensor unit comprises at least one of a fingerprint scanner, an iris scanner, a retinal scanner, a motion sensor, an accelerometer, or a digital camera; and
   the second biometric data comprises at least one of a fingerprint sample, an iris scan, a retinal, or postural data characterizing a posture or gait of a user.

17. The computer-implemented method of claim 12, wherein:
   the second biometric data comprises a plurality of biometric data samples, the biometric data samples being captured by the sensor unit during a corresponding sampling interval; and
   the computer-implemented method further comprises:
      identifying, by the at least one hardware processor, feature points within each of the biometric data samples;
      based on the second biometric data, generating, by the at least one hardware processor, first coordinate data that maps the identified feature points to corresponding first coordinates, the first coordinates being associated with the sensor unit; and
      computing, by the at least one hardware processor, first displacements between the first coordinates of corresponding pairs of the identified feature points within the biometric data samples.

18. The computer-implemented method of claim 17, wherein:
   the first biometric data comprises a first hash value; and
   the computer-implemented method further comprises:
      based on the computed first displacements, establishing, by the at least one hardware processor, a displacement range for the each of the identified pairs of feature points;
      determining, by the at least one hardware processor, a range value that characterizes the displacement range for each of the identified pairs of feature points;
      computing, by the at least one hardware processor, a second hash value based on the range values; and
      authenticating, by the at least one hardware processor, the identity when the first hash value corresponds to the second hash value.

19. The computer-implemented method of claim 12, further comprising:
   receiving, by the at least one hardware processor, third biometric data captured by the sensor unit; and
   transmitting, by the at least one hardware processor, the public cryptographic key and at least a portion of the third biometric data to the computing system, the computing system being further configured to generate an additional element of the distributed ledger data that associates the portions of the third biometric data with the public cryptographic key.

20. A tangible, non-transitory computer-readable medium storing instructions that, when executed by at least one hardware processor, cause the at least one hardware processor to perform a method, comprising:
   transmitting a public cryptographic key to a computing system, the computing system being configured to obtain first biometric data from an element of distributed ledger data associated with the public cryptographic key;
   receiving the first biometric data from the computing system; and
   authenticating an identity associated with the device based on the first biometric data and on second biometric data captured by a sensor unit.

* * * * *